United States Patent [19]
Samsavar et al.

[11] Patent Number: 5,948,972
[45] Date of Patent: Sep. 7, 1999

[54] DUAL STAGE INSTRUMENT FOR SCANNING A SPECIMEN

[75] Inventors: Amin Samsavar, Sunnyvale; William R. Wheeler, Saratoga; Steven G. Eaton, Sunnyvale, all of Calif.

[73] Assignee: KLA-Tencor Corporation, San Jose, Calif.

[21] Appl. No.: 08/730,641

[22] Filed: Oct. 11, 1996

Related U.S. Application Data

[63] Continuation-in-part of application No. 08/598,848, Feb. 9, 1996, abandoned, which is a continuation-in-part of application No. 08/362,818, Dec. 22, 1994, Pat. No. 5,705,741.

[51] Int. Cl.$^6$ .................................................. G01B 5/28
[52] U.S. Cl. ............................................................ 73/105
[58] Field of Search .............................. 73/105; 250/306, 250/307

[56] References Cited

U.S. PATENT DOCUMENTS

| Re. 34,331 | 8/1993 | Elings et al. . |
|---|---|---|
| 2,691,887 | 10/1954 | Rinker . |
| 2,728,222 | 12/1955 | Becker et al. . |
| 3,283,568 | 11/1966 | Reason . |
| 4,103,542 | 8/1978 | Wheeler et al. . |
| 4,391,044 | 7/1983 | Wheeler . |
| 4,441,177 | 4/1984 | Groh et al. . |
| 4,574,625 | 3/1986 | Olasz et al. . |
| 4,641,773 | 2/1987 | Morino et al. . |
| 4,669,300 | 6/1987 | Hall et al. . |
| 4,724,318 | 2/1988 | Binnig . |

(List continued on next page.)

FOREIGN PATENT DOCUMENTS

| 0361932 | 9/1989 | European Pat. Off. . | |
|---|---|---|---|
| 0536827 | 9/1992 | European Pat. Off. . | |
| 0594362 | 10/1993 | European Pat. Off. . | |
| 0633450 | 6/1994 | European Pat. Off. . | |
| 2249910 | 10/1990 | Japan ........................................ | 73/105 |
| 2009409 | 6/1979 | United Kingdom ..................... | 73/105 |
| WO 88/04047 | 6/1988 | WIPO . | |
| WO 94/08204 | 4/1994 | WIPO ..................................... | 73/105 |
| WO 94/25888 | 11/1994 | WIPO . | |

OTHER PUBLICATIONS

"A New Force Sensor Incorporating Force–Feedback Control for Interfacial Force Microscopy", S. Joyce et al., Rev. Sci. Instrum., vol. 62, No. 03, Mar. 1991, pp. 710–715.

"From Molecules to Cells: Imaging Soft Samples with the Atomic Force Microscope", M. Radmacher et al., Science, vol. 257, Sep. 25, 1992, pp. 1900–1905.

"Dimensional Metrology of Phase–Shifting Masks with Scanning Probe Microscopes," J.E. Griffith et al., *SPIE*, vol. 2087, Photomask Technology and Management, 1993, pp. 107–118.

"Silicon Wafer Thermal Processing: 300 mm Issues," H. Huff et al., *Future Fab International*, 1996, pp. 35–49.

"Atomic force microscopy for high speed imaging using cantilevers with an integrated actuator and sensor," S.R. Manalis et al., *Appl. Phys. Lett.*, 68(6), Feb. 5, 1996, pp. 871–873.

(List continued on next page.)

*Primary Examiner*—Daniel S. Larkin
*Attorney, Agent, or Firm*—Majestic, Parsons, Siebert & Hsue P.C.

[57] ABSTRACT

A dual stage scanning instrument includes a sensor for sensing a parameter of a sample and coarse and fine stages for causing relative motion between the sensor and the sample. The coarse stage has a resolution of about 1 micrometer and the fine stage has a resolution of 1 nanometer or better. The sensor is used to sense the parameter when both stages cause relative motion between the sensor assembly and the sample, The sensor may be used to sense height variations of the sample surface as well as thermal variations electrostatic, magnetic, light reflectivity or light transmission parameters at the same time when height variation is sensed. By performing along scan at a coarser resolution and short scans a high resolution using the same probe tip or two probe tips at fixed relative positions, data obtained from the long and short scans can be correlated accurately.

75 Claims, 25 Drawing Sheets

U.S. PATENT DOCUMENTS

| | | |
|---|---|---|
| 4,883,959 | 11/1989 | Hosoki et al. .......................... 250/306 |
| 5,146,690 | 9/1992 | Breitmeier . |
| 5,253,106 | 10/1993 | Hazard . |
| 5,266,801 | 11/1993 | Elings et al. . |
| 5,307,693 | 5/1994 | Griffith et al. . |
| 5,308,974 | 5/1994 | Elings et al. . |
| 5,309,755 | 5/1994 | Wheeler . |
| 5,347,854 | 9/1994 | Martin et al. . |
| 5,406,832 | 4/1995 | Gamble et al. .......................... 73/105 |
| 5,412,980 | 5/1995 | Elings et al. . |
| 5,414,690 | 5/1995 | Shido et al. ............................ 250/306 |
| 5,426,302 | 6/1995 | Marchman et al. ..................... 250/306 |
| 5,481,521 | 1/1996 | Washizawa et al. .................... 250/306 |
| 5,488,862 | 2/1996 | Neukermans et al. . |
| 5,509,300 | 4/1996 | Chamberlin et al. ..................... 73/105 |
| 5,513,168 | 4/1996 | Fujihara et al. ........................ 250/306 |
| 5,627,365 | 5/1997 | Chiba et al. ............................. 73/105 |
| 5,629,790 | 5/1997 | Neukermans et al. . |

OTHER PUBLICATIONS

"Single–Tube Three–Dimensional Scanner for Scanning Tunneling Microscopy," G. Binnig et al., *Review of Scientific Instruments*, vol. 57, No. 8, Aug. 1986, pp. 1688–1689.

"Magnetic Force Microscopy (MFM)," P. Grütter et al., Springer Series in Surface Sciences, *Scanning Tunneling Microscopy II*, vol. 28, Springer–Verlag Berlin Heidelberg 1992, pp. 152–207.

"A Stand–Alone Scanning Force and Friction Microscope," M. Hipp et al., *Ultramicroscopy*, 42–44(1992), Elsevier Science Publishers B.V., pp. 1498–1503.

"New Scanning Device for Scanning Tunneling Microscope Applications," R. Koops et al., *Review of Scientific Instruments*, vol. 63, No. 8, Aug. 1992, pp. 4008–4009.

"Scanning Tunneling Microscopy," G. Binnig et al., *Helvetica Physica Acts*, vol. 55, 1982, pp. 726–735.

"Two–Scanning Tunneling Microscope Devices for Large Samples," G.B. Picotto et al., *Review of Scientific Instruments*, vol. 64, No. 9, Sep. 1993, pp. 2699–2701.

"A High Precision Micropositioner Based on Magnetostriction Principle," W. Wang et al., *Review of Scientific Instruments*, vol. 63, No. 1, Jan. 1992, pp. 249–254.

"Design and Assessment of Monolithic High Precision Translation Mechanisms," S.T. Smith et al., *Journal of Physics E: Scientific Instruments*, vol. 20, Aug. 1987, pp. 977–983.

"Novel Optical Approach to Atomic Force Microscopy," G. Meyer et al., *Applied Physics Letters*, vol. 53, No. 12, Sep. 1988, pp. 1045–1047.

"Long Range Constant Force Profiling for Measurement of Engineering Surfaces," L.P. Howard, *Review of Scientific Instruments*, vol. 63, No. 10, Oct. 1992, pp. 4289–4295.

"The National Institute of Standards and Technology Molecular Measuring Machine Project: Metrology and Precision Engineering Design," E.C. Teague, *J. Vac. Sci. Technol. B*, vol. 7, No. 6, Nov./Dec. 1989, pp. 1898–1902.

"Evaluating the Sensitivity of a Fiber–Optic Displacement Sensor," W.C. Oliver, Nano Instruments, Inc., *Technotes*, no date available.

"To Measure a Molecule," F. Flam, pp. 21–24, no date available.

"The National Institute of Standards and Technology Molecular Measuring Machine: A Long–Range Scanning Tuneling Microscope for Dimensional Metrology," E.C. Teague, *Microbeam Analysis*, 1989, pp. 545–547.

"Products for Micropositioning," Product Information Brochure published by Physik Instrumente (PI) GmbH & Co., no date available.

"Fiber Optic Proximity Sensors," Product Information Brochure published by Phone–Or, Ltd., Fiber Optic Sensors of Ashkelon ISRAEL, no date available.

"Series 88 Fiber–Optic Displaceent Sensors," G. J.Philps, *Sensors*, Feb. 1995.

"Nanometrology," E.C. Teague; *Proceedings of Scanned Probe Microscopy; STM and Beyond*, an Engineering Foundation Conference, Santa Barbara, CA Jan. 1991.

"Microlever with combined integrated sensor/actuator functions for scanning force microscopy," J. Brugger et al., *Sensors and Actuators A*, 43, 1994, pp. 339–345.

"Rocking–beam force–balance approach to atomic force microscopy," D.A. Grigg et al., *Ultramicroscopy*, 42–44, 1992, pp. 1504–1508.

"Scanning force microscope springs optimized for optical––beam deflections and with tips made by controlled fracture," M.G.L. Gustafsson et al.,*J. Appl. Phys.*, 76(1), Jul. 1, 1994, pp. 172–181.

"Thermal Imaging of Electronic Materials and Devices Using the Atomic Force Microscope," A. Majumdar et al., *Proceedings of the SPIE—The International Society for Optical Engineering*, 1993, Abstract Only.

"Micromachined AFM transducer with differential capacitive read–out," J. Bay et al., *J. Micromech. Microeng.*, vol. 5, 1995, pp. 161–165.

"Dimensional metrology with scanning probe microscopes," J. Griffith et al., *J. Appl. Phys.*, vol. 74, No. 9, Nov. 1, 1993, pp. R83–R109.

"A rocking beam electrostatic balance for the measurement of small forces," G. L. Miller et al., *Rev. Sci. Instrum.*, vol. 62, No. 3, Mar. 1991, pp. 705–709.

"Resonant silicon sensors," G. Stemme, *J. Micromech. Microeng.*, vol. 1, 1991, pp. 113–125.

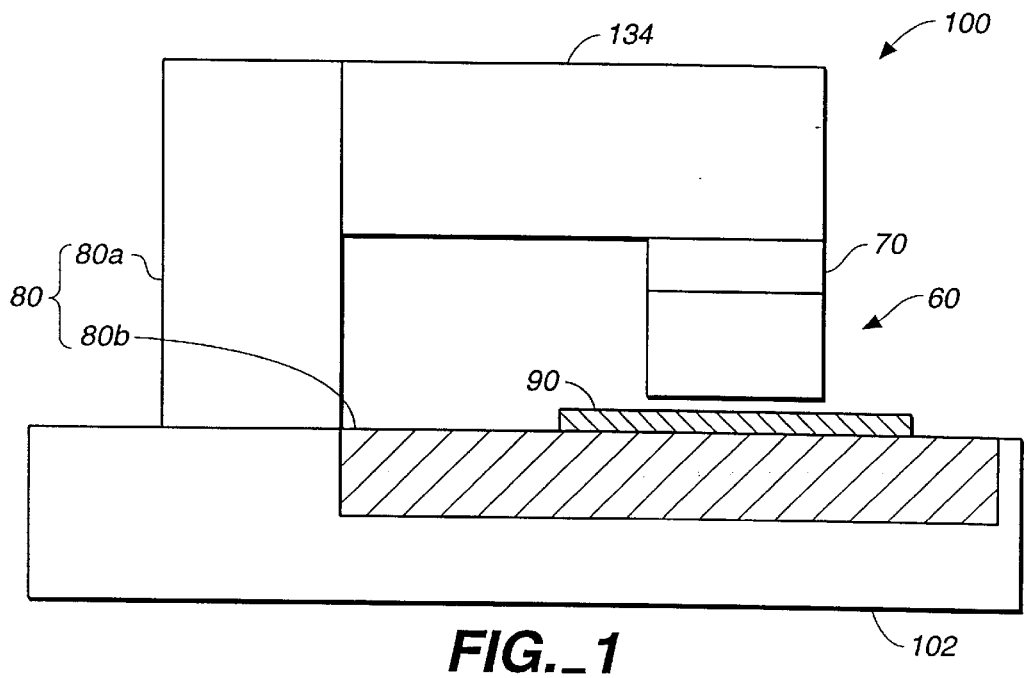
FIG._1
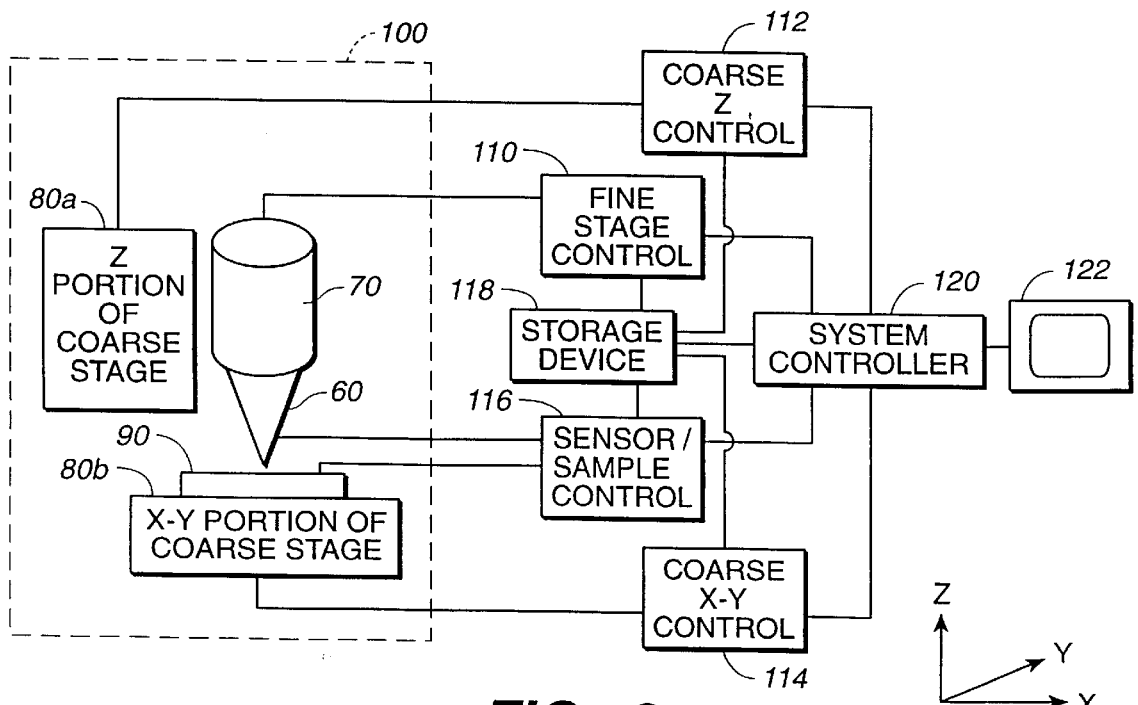
FIG._2

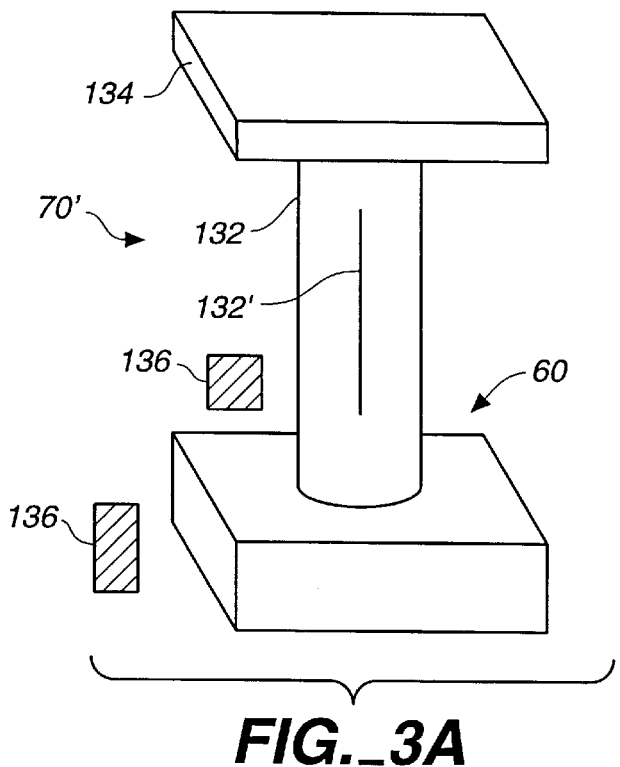
FIG._3A
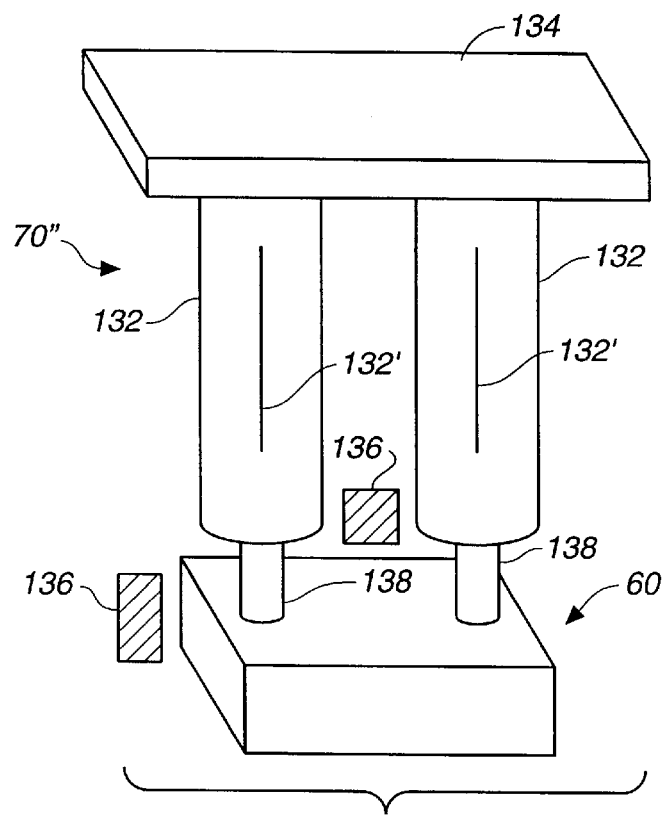
FIG._3B

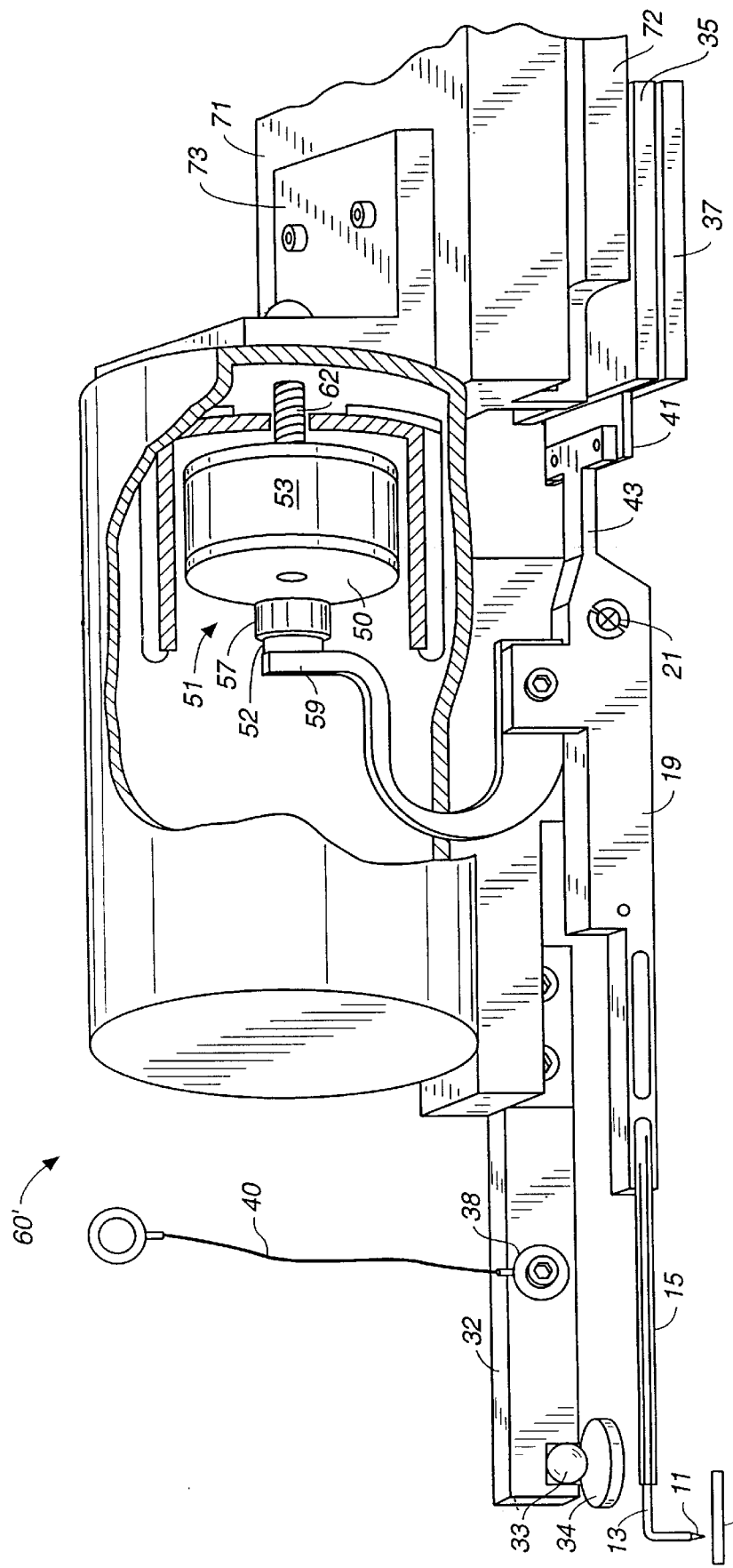
FIG._4A

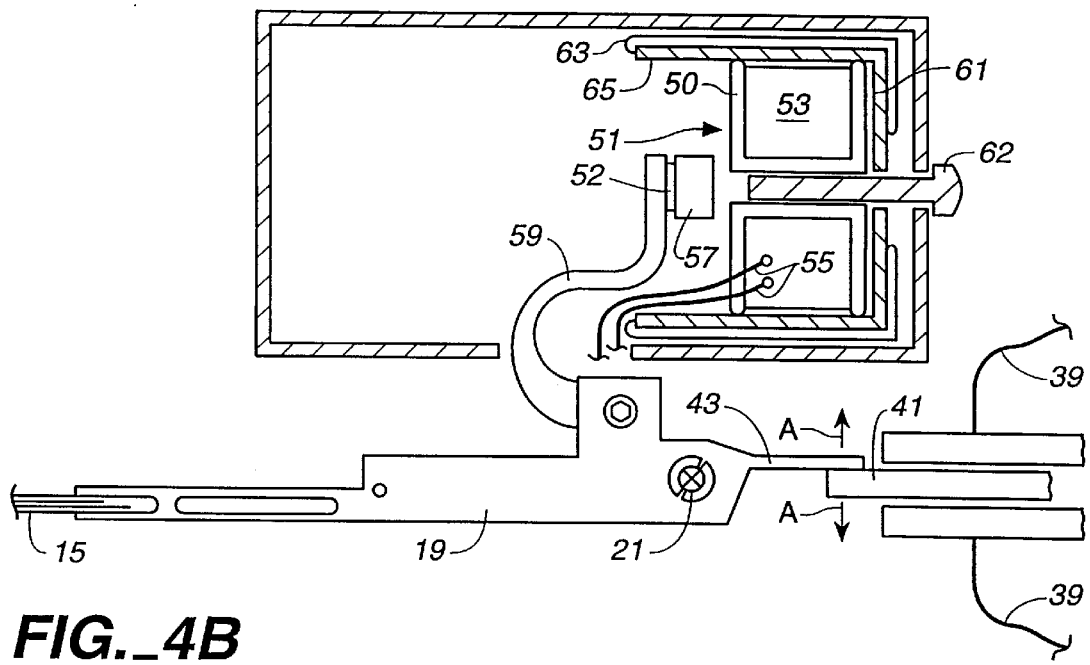
FIG._4B
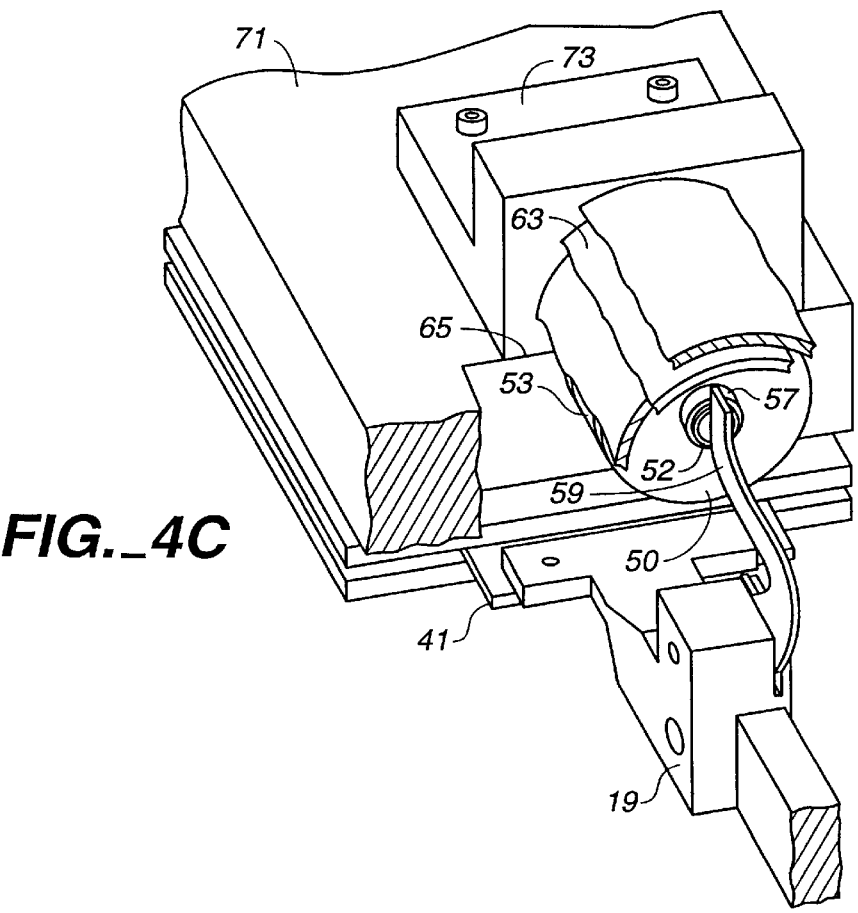
FIG._4C

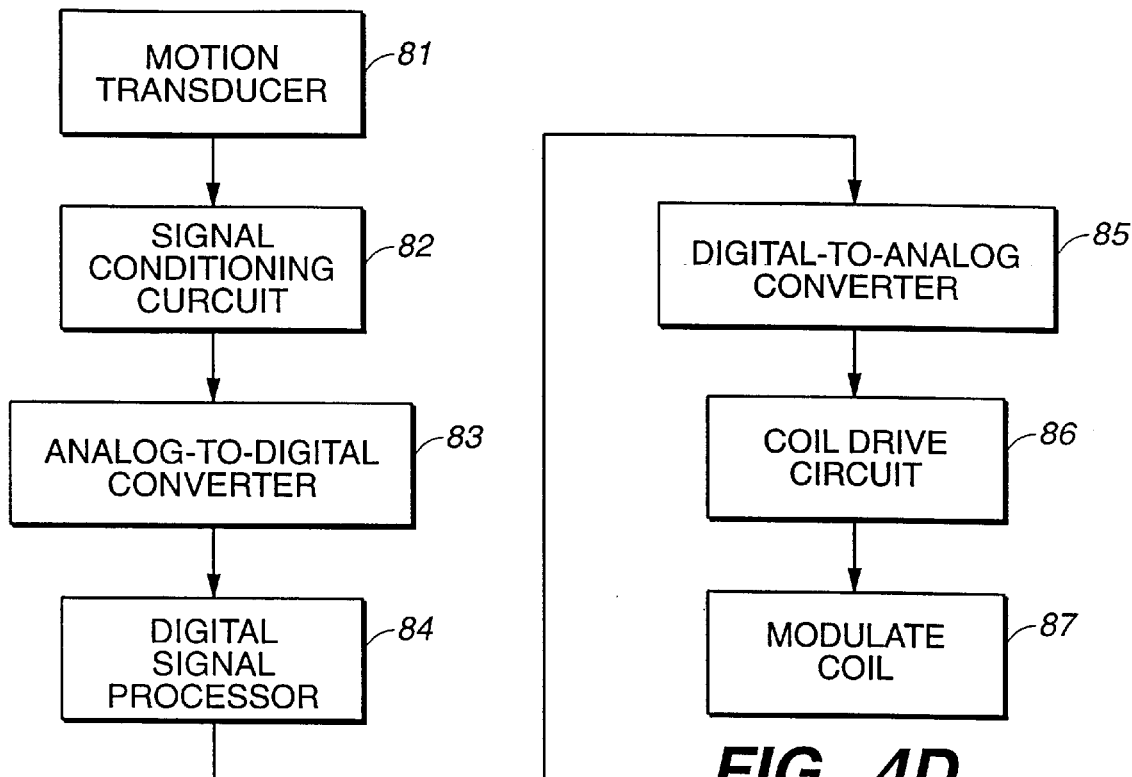
FIG._4D
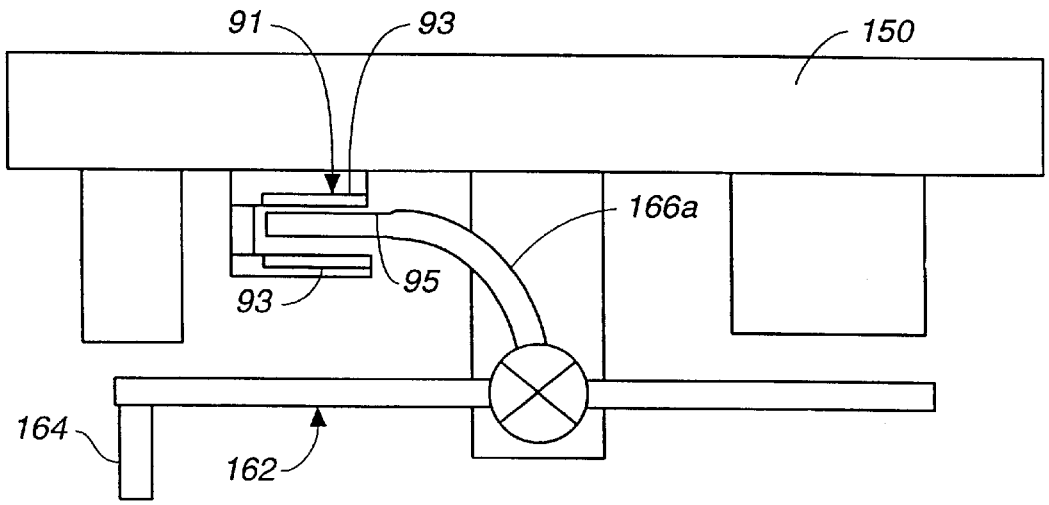
FIG._4E

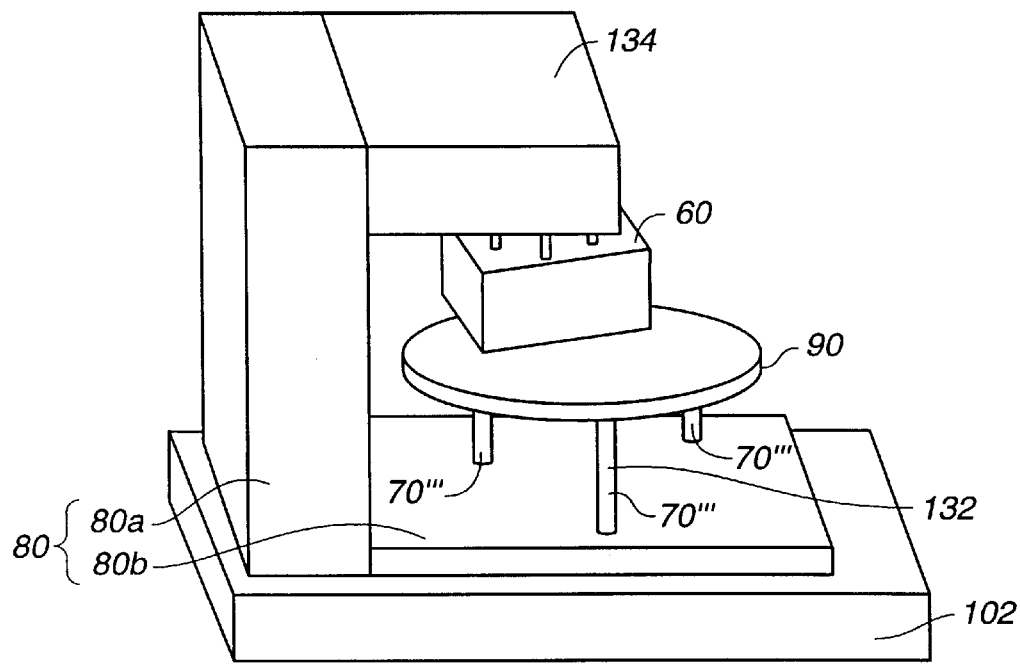
FIG._5
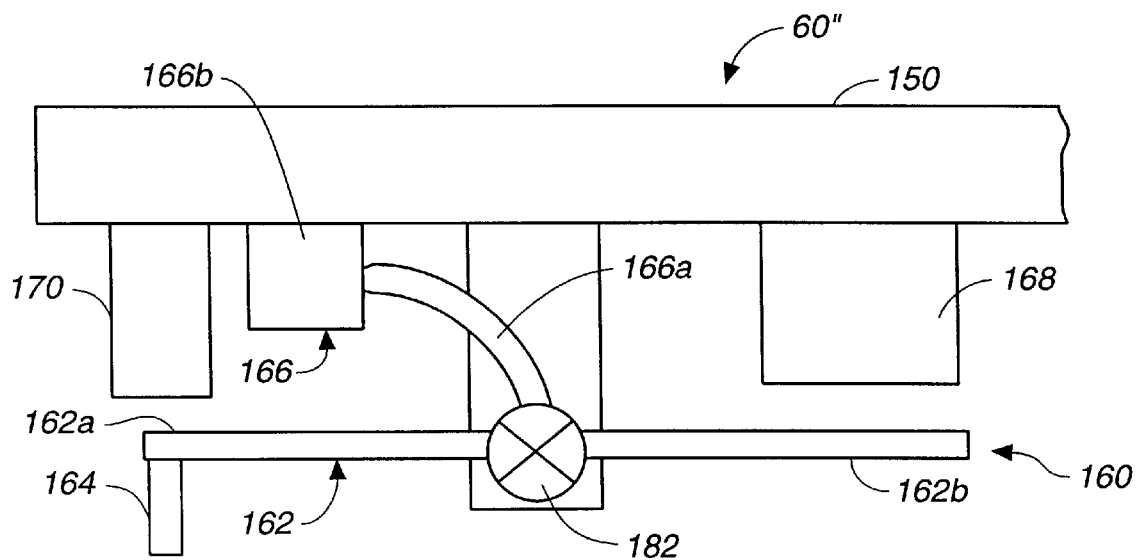
FIG._6

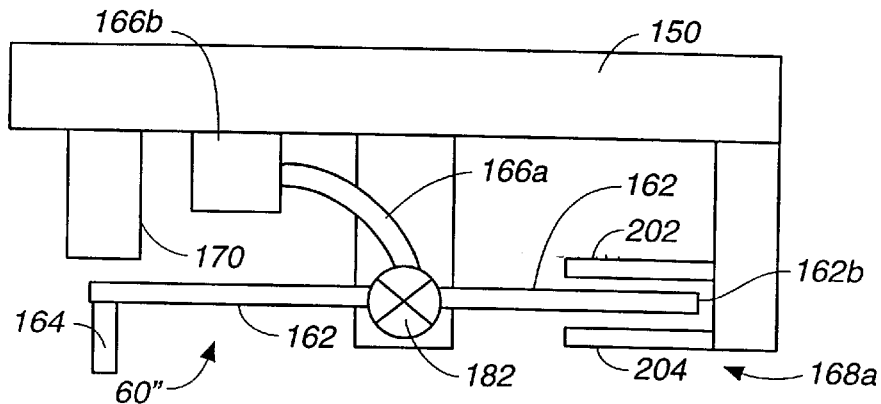
FIG._7A
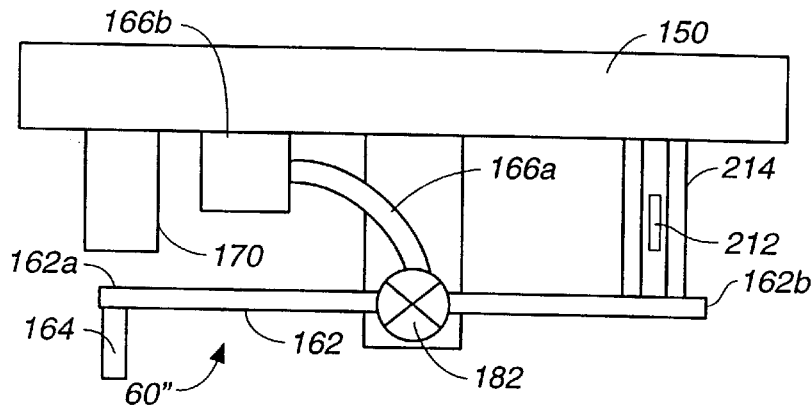
FIG._7B
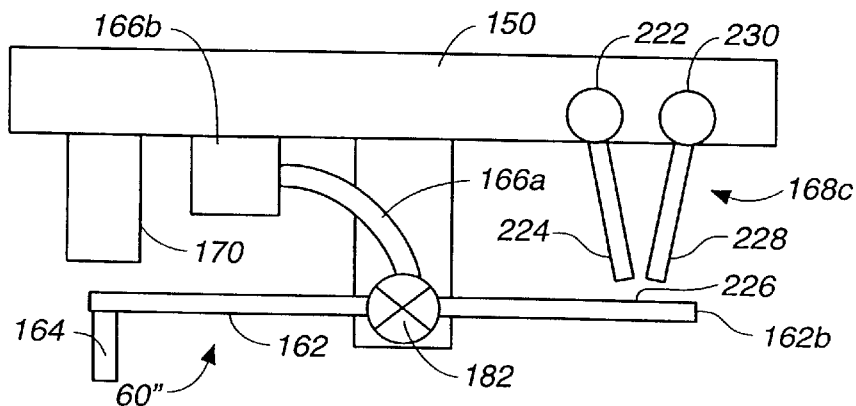
FIG._7C

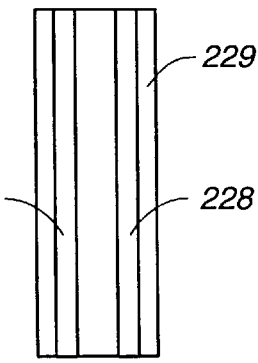
FIG._7D
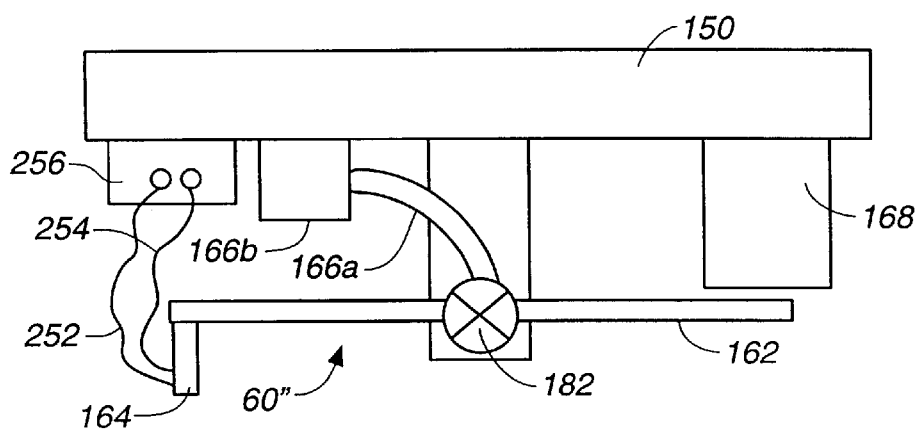
FIG._8A
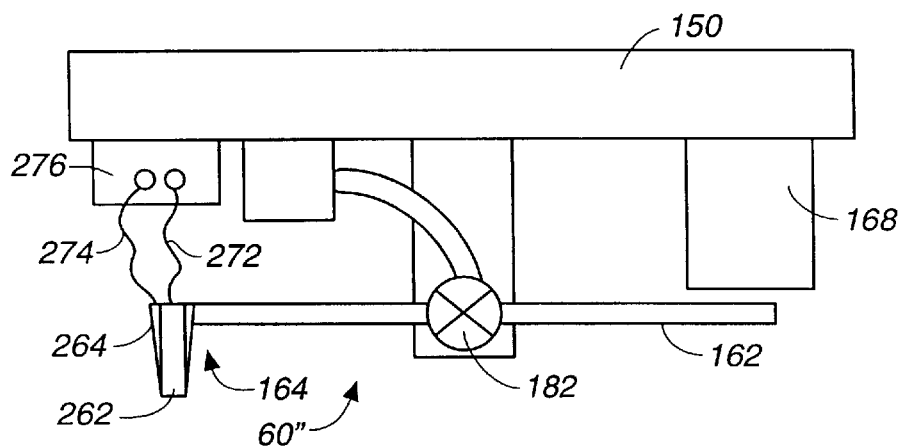
FIG._8B

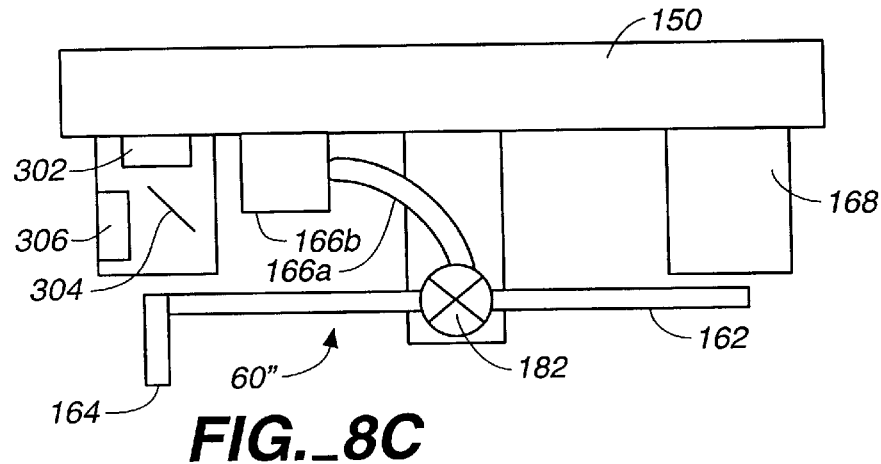
FIG._8C
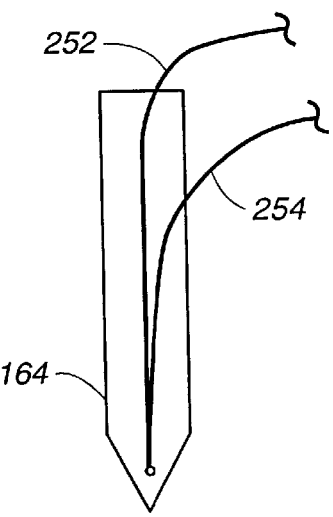
FIG._9
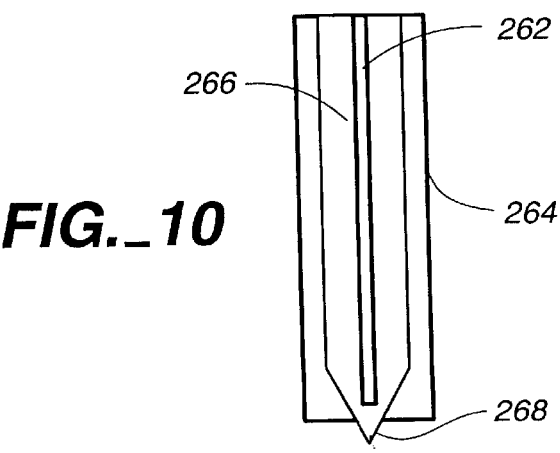
FIG._10

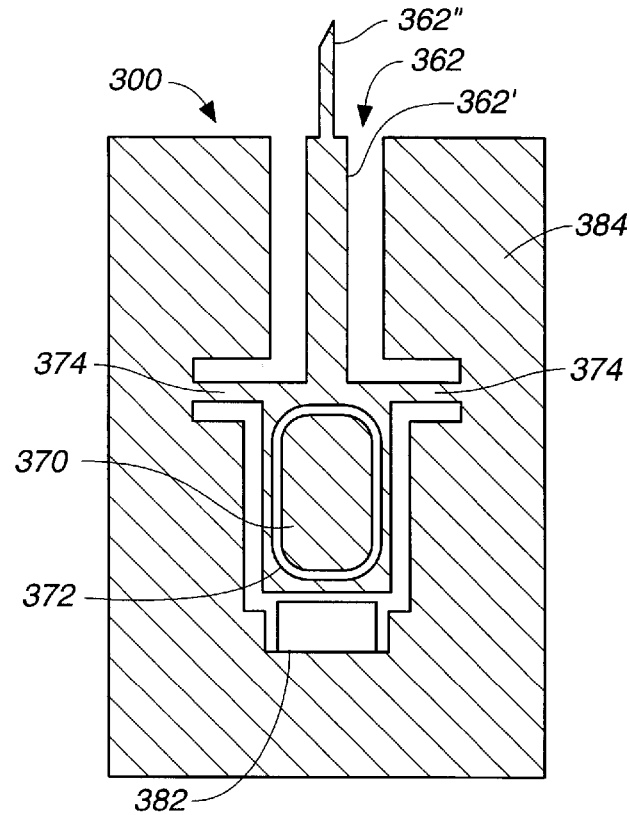
FIG._11
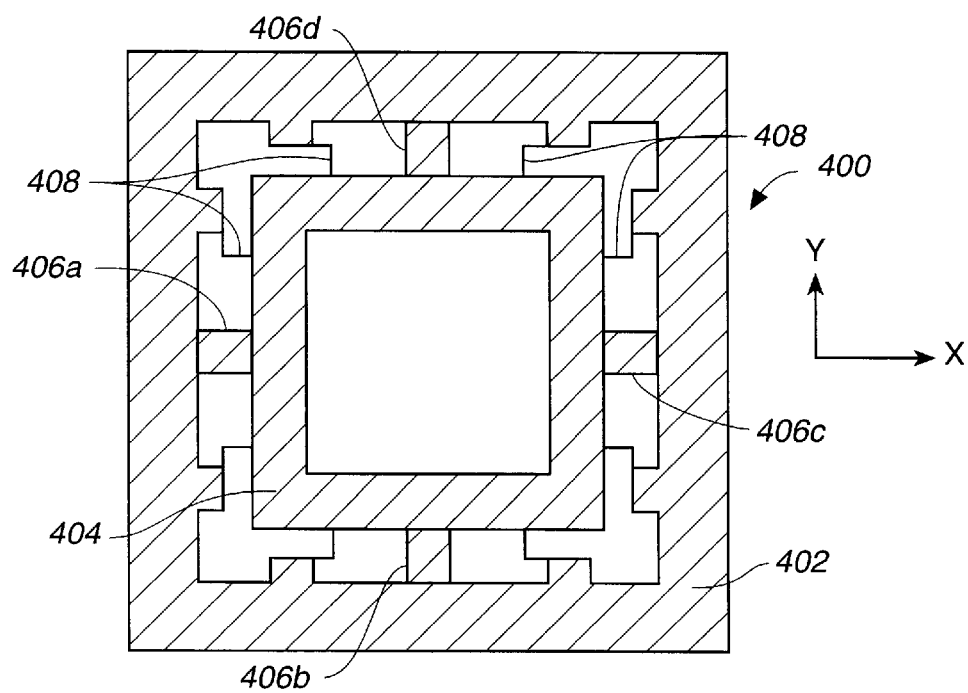
FIG._12

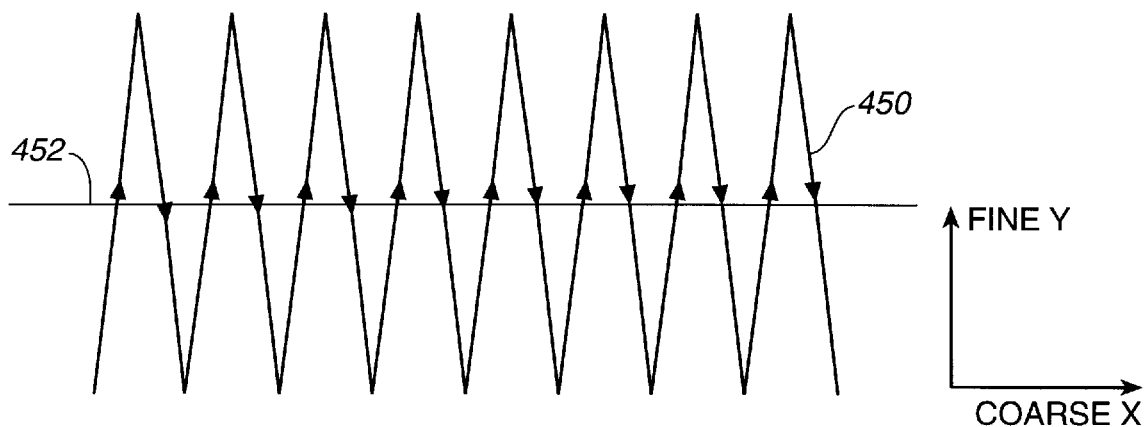
FIG._13
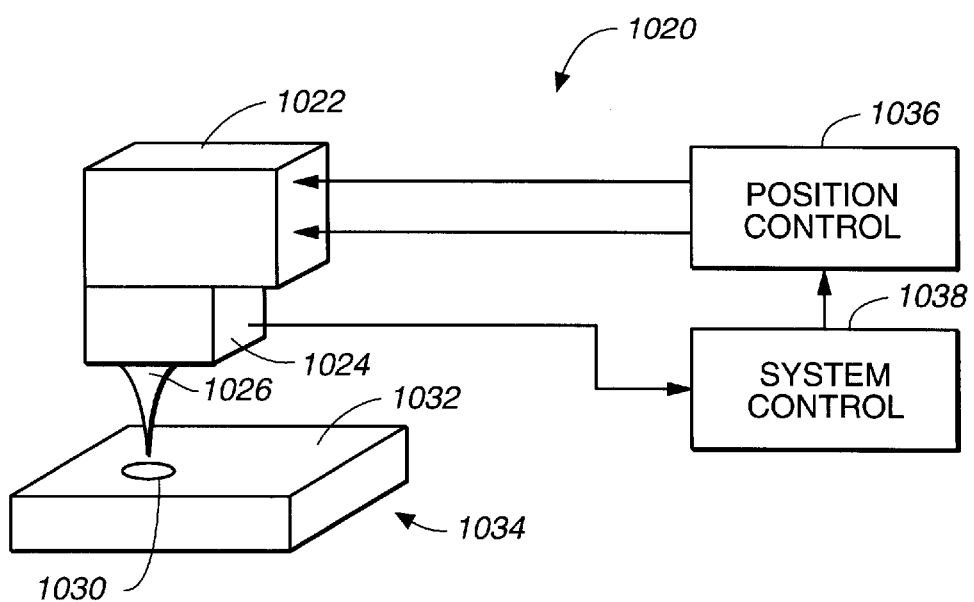
FIG._14

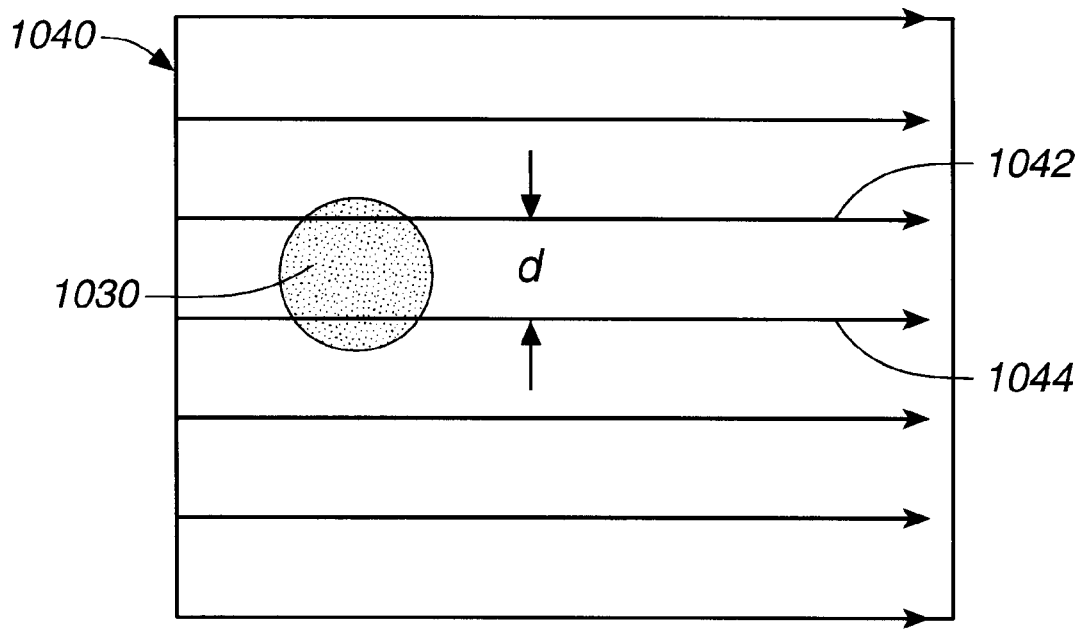
FIG._15
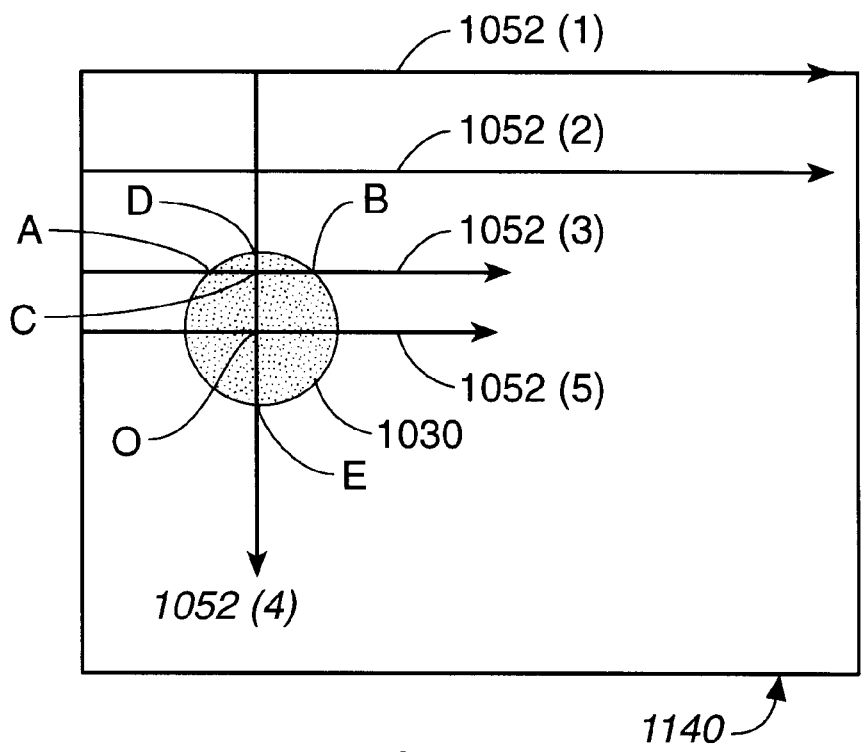
FIG._16

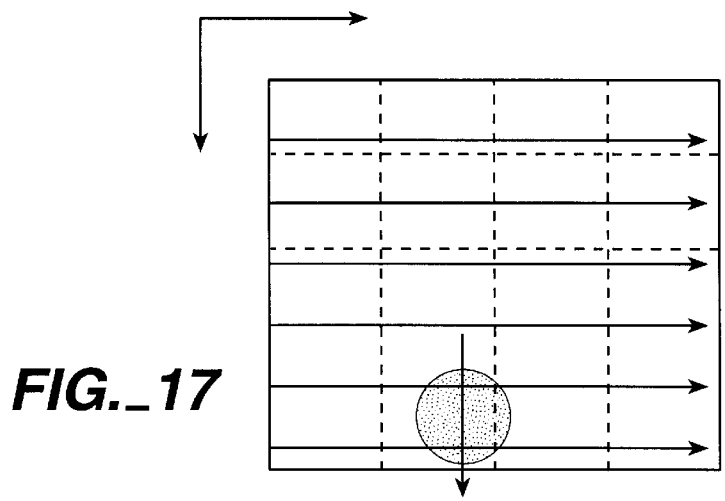
FIG._17
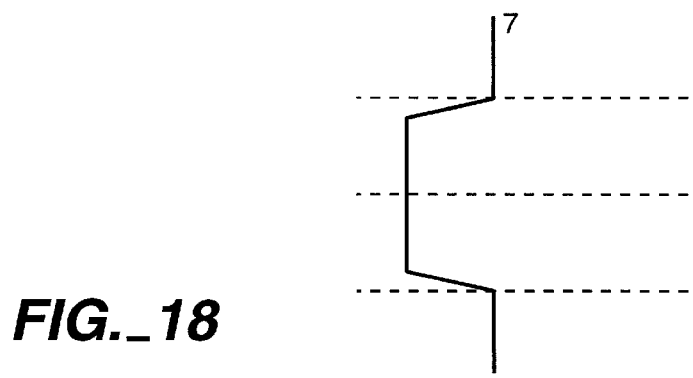
FIG._18
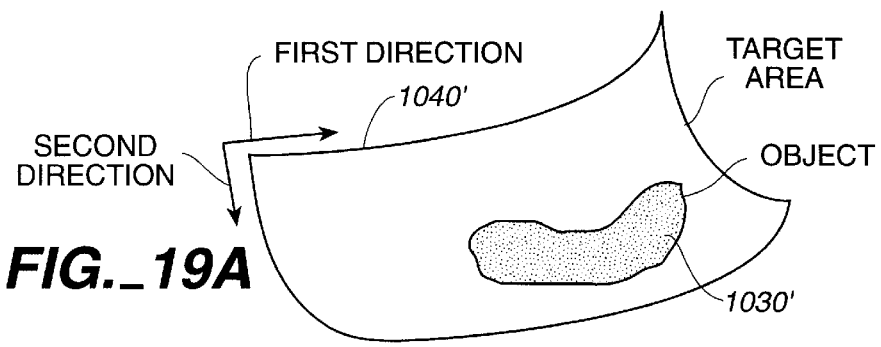
FIG._19A
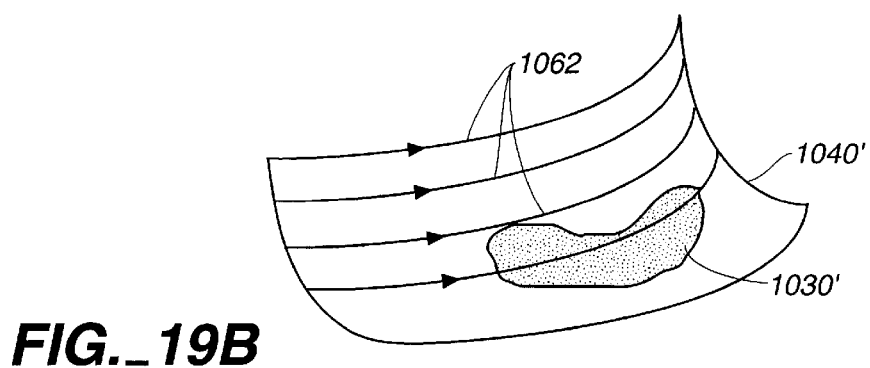
FIG._19B

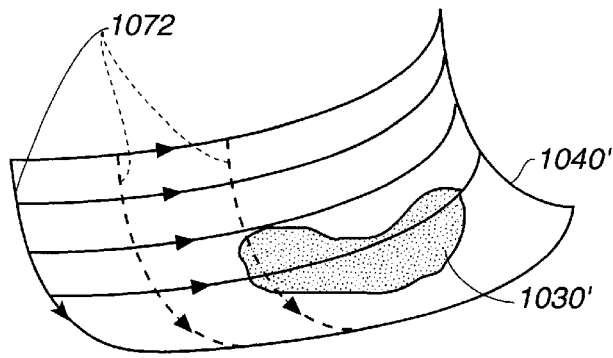
FIG._19C
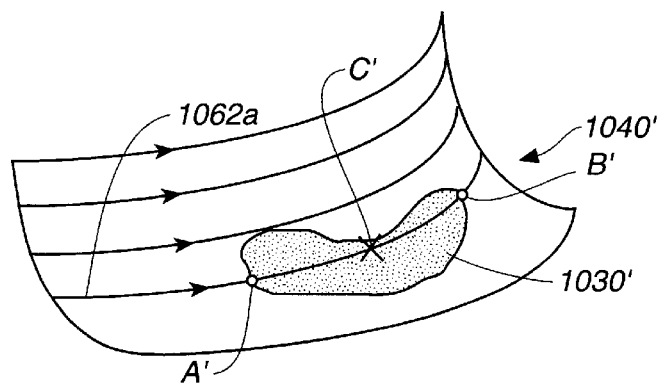
FIG._19D
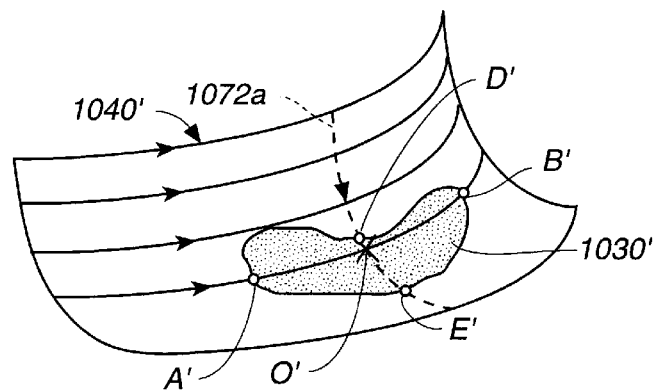
FIG._19E
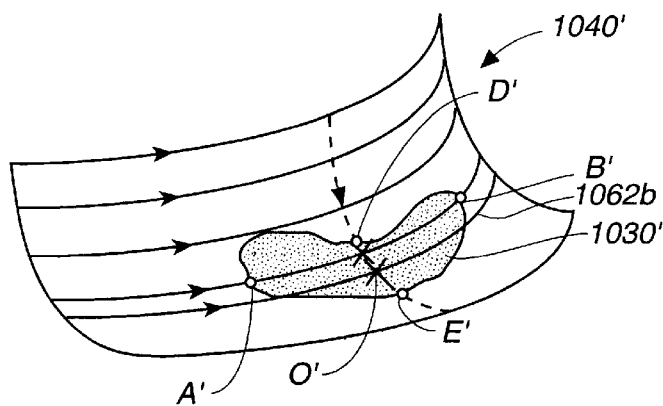
FIG._19F

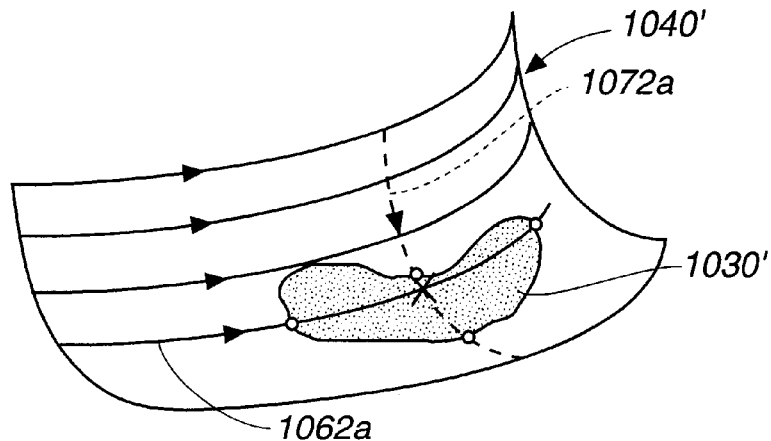
FIG._19G
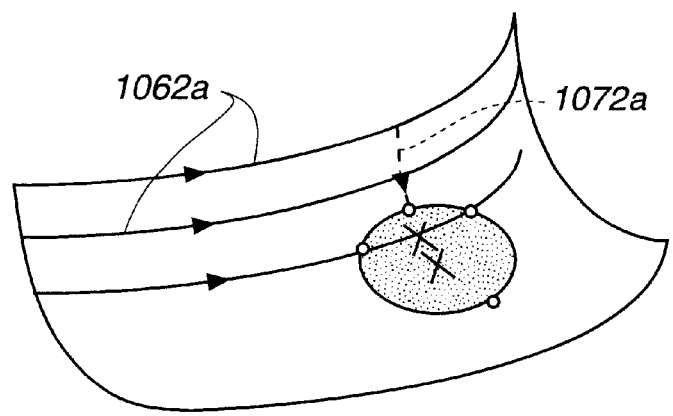
FIG._19H
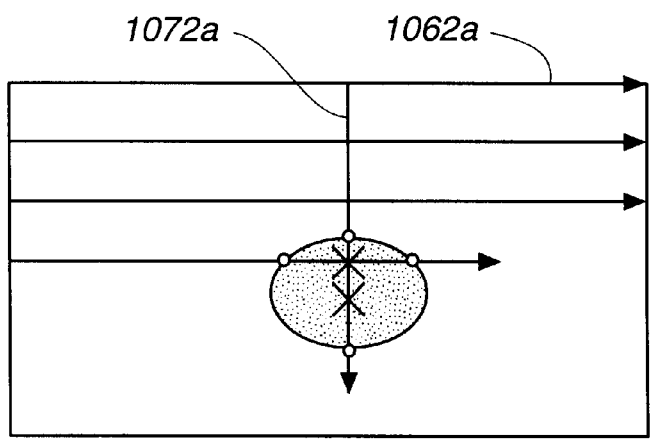
FIG._19I

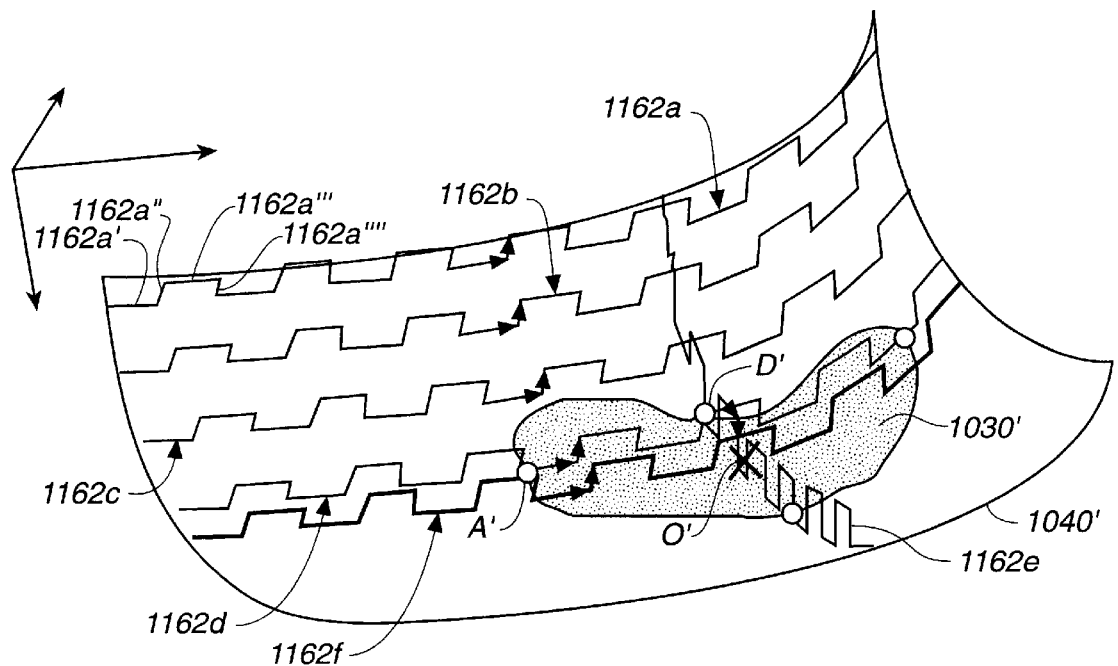
FIG._20A
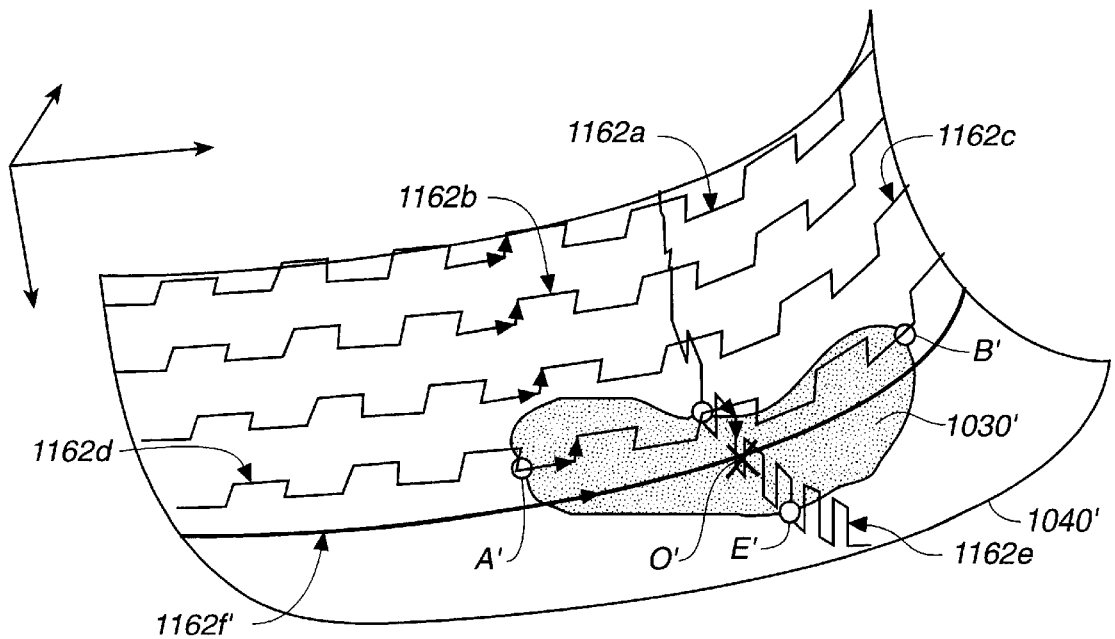
FIG._20B

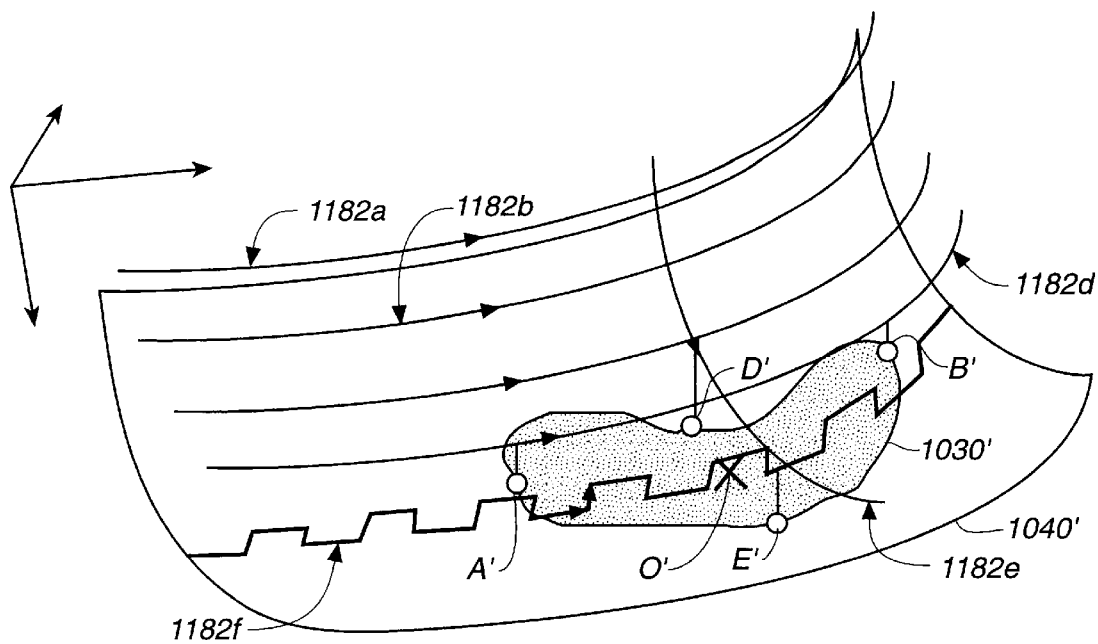
FIG._20C
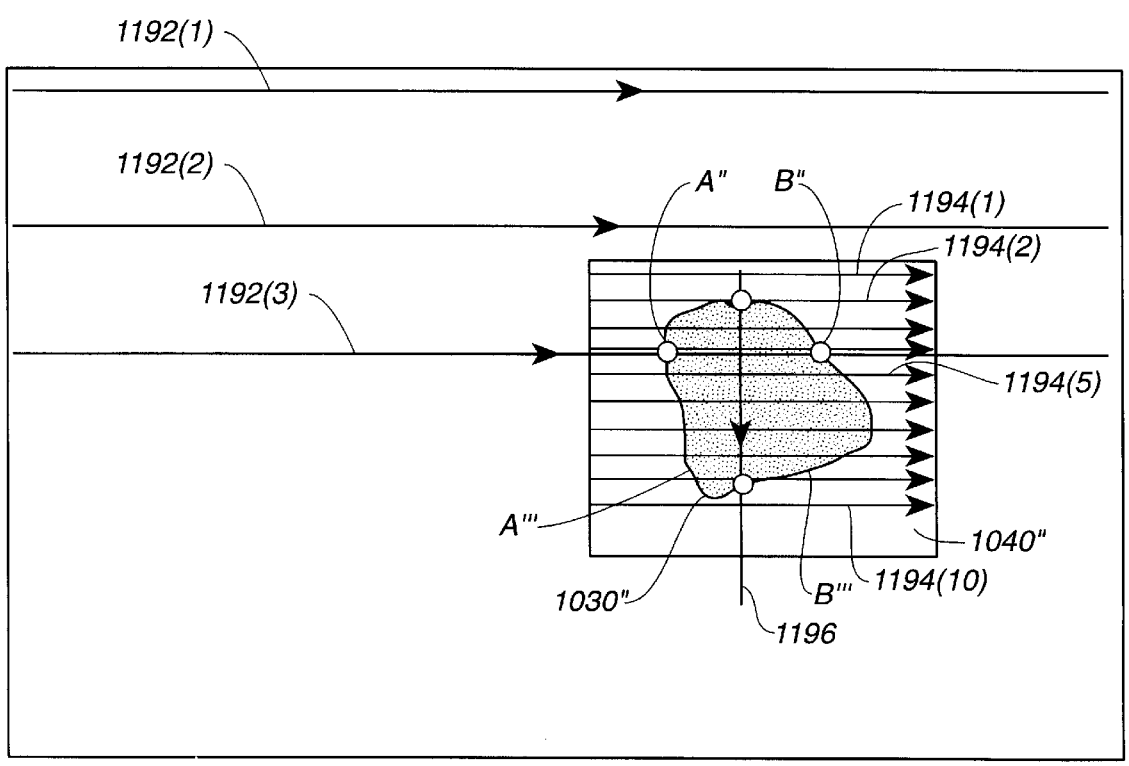
FIG._20D

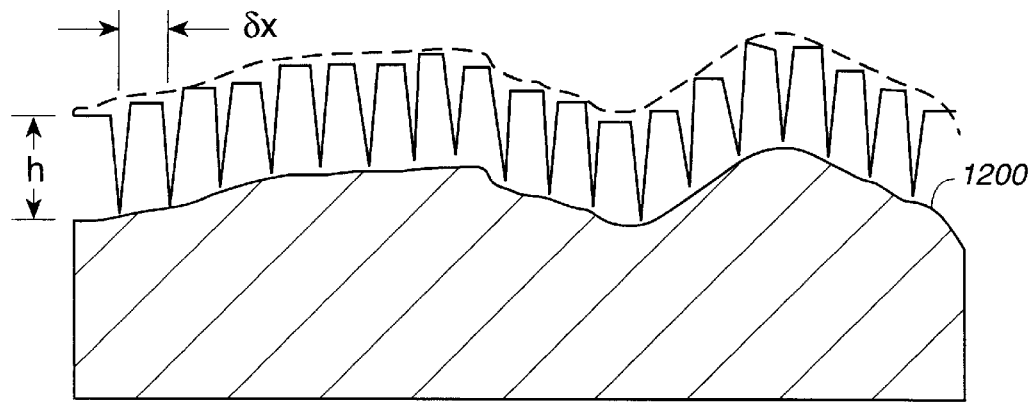
FIG._21A
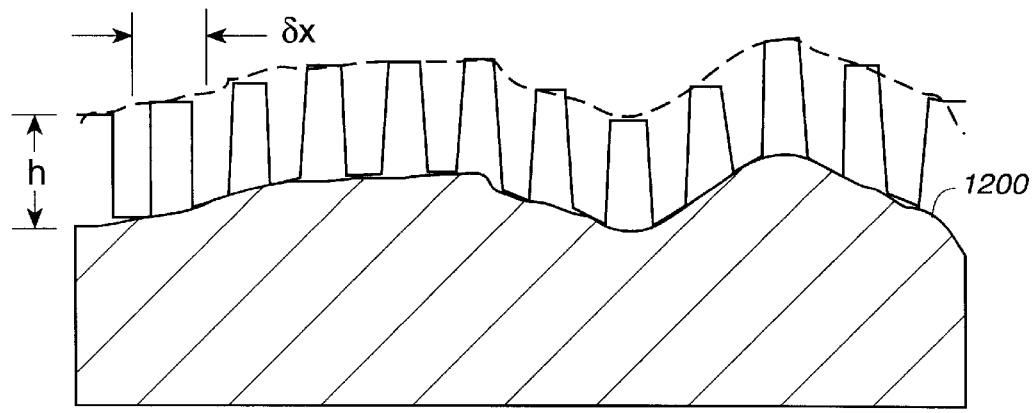
FIG._21B
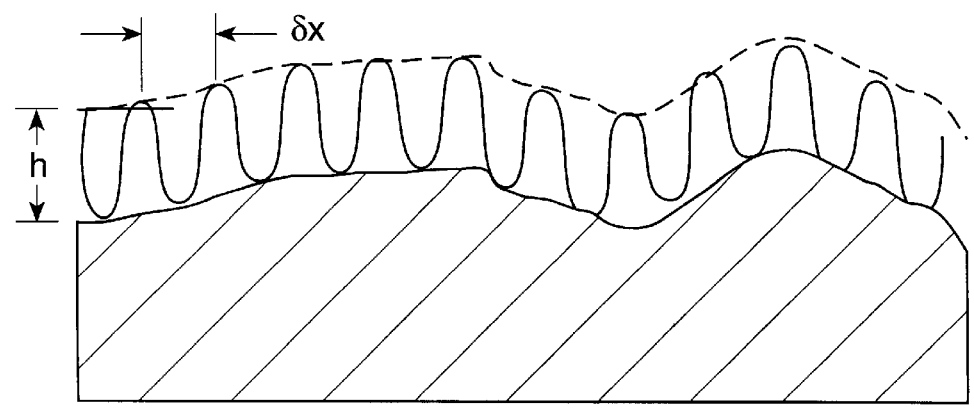
FIG._21C

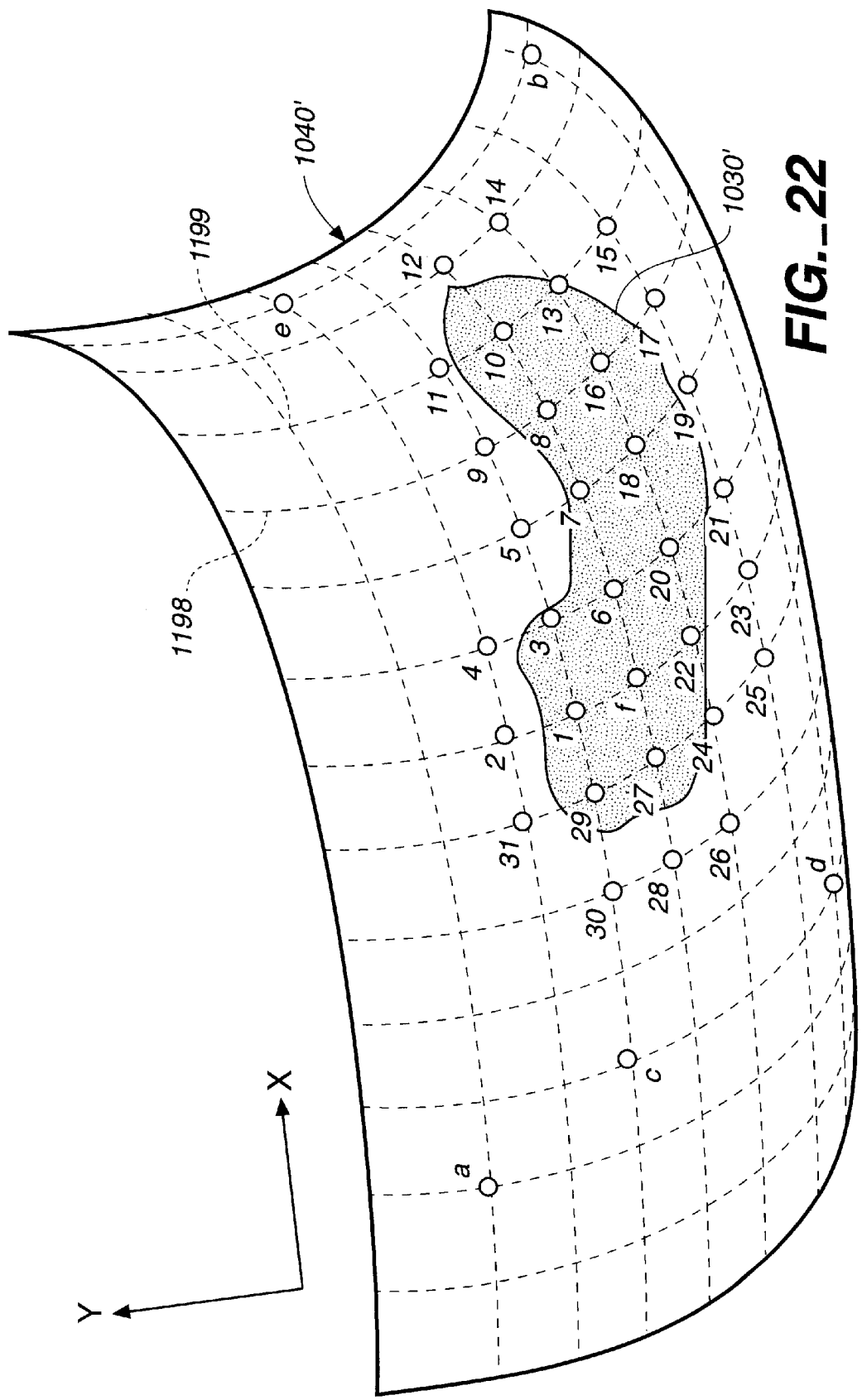
FIG._22

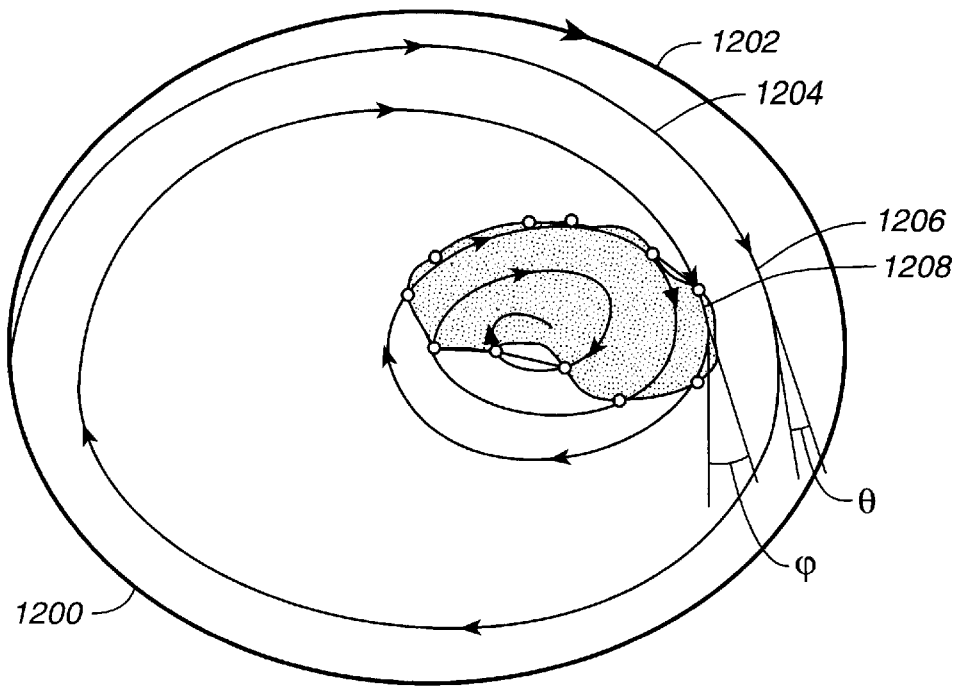
FIG._23
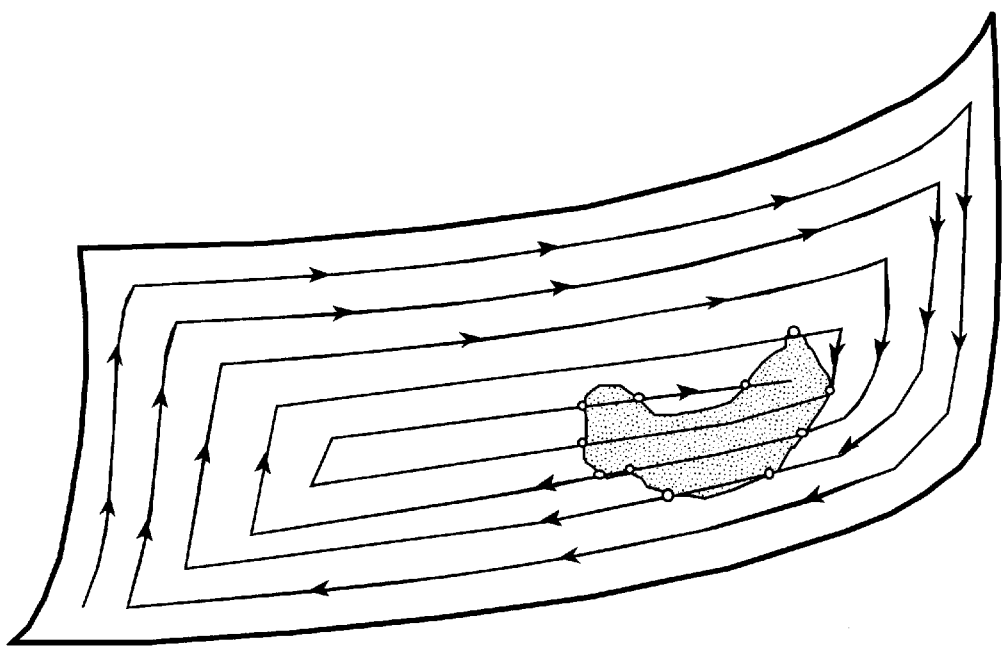
FIG._24

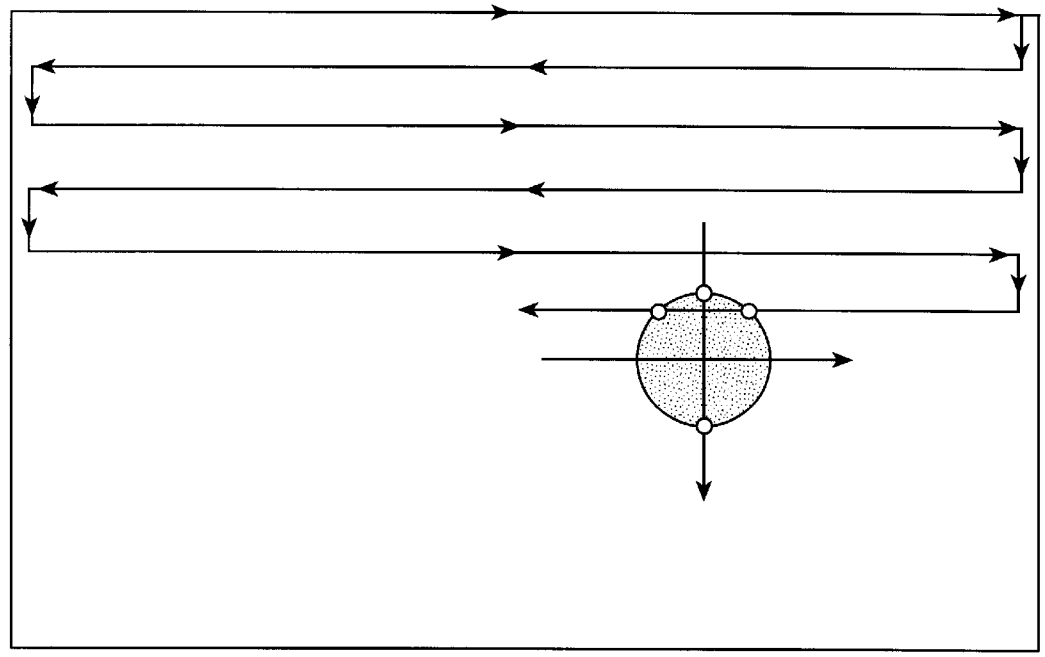
FIG._25
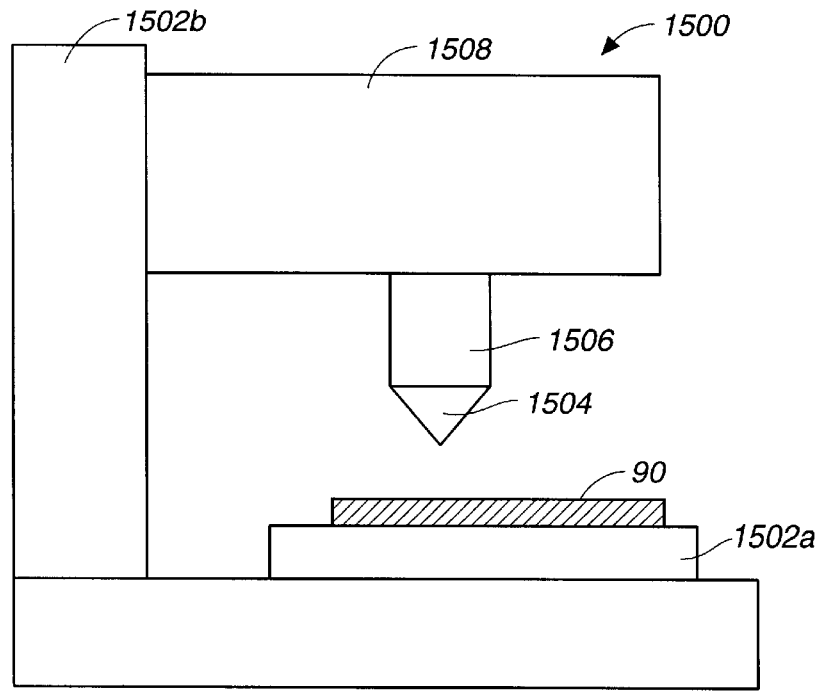
FIG._26
*(PRIOR ART)*

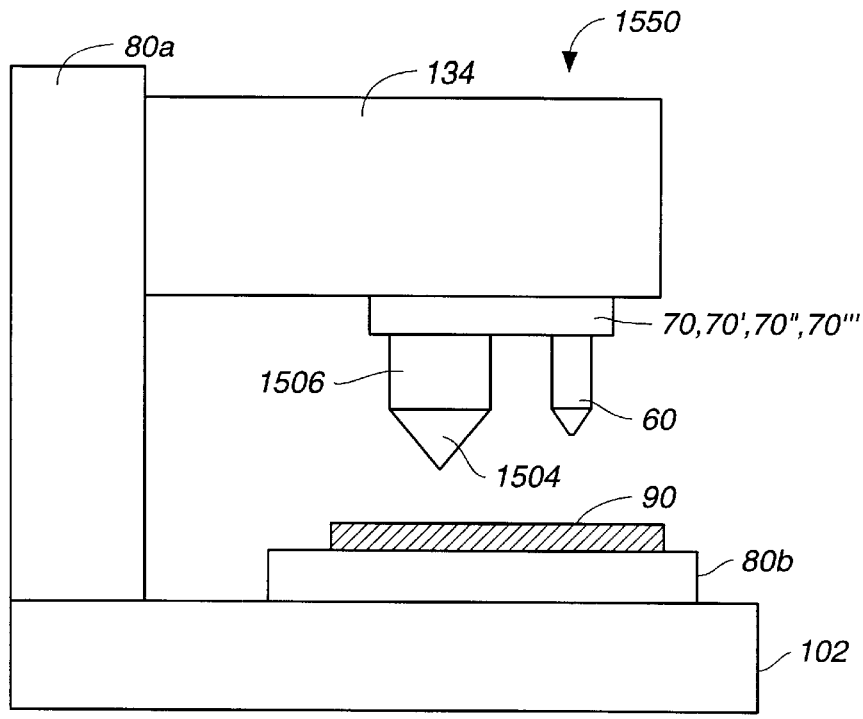
FIG._27
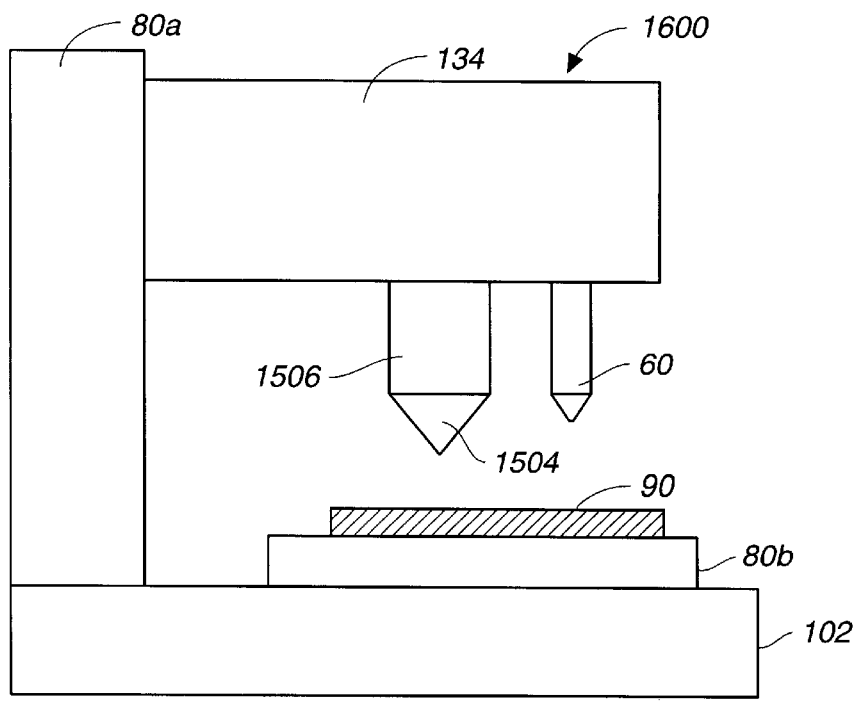
FIG._28

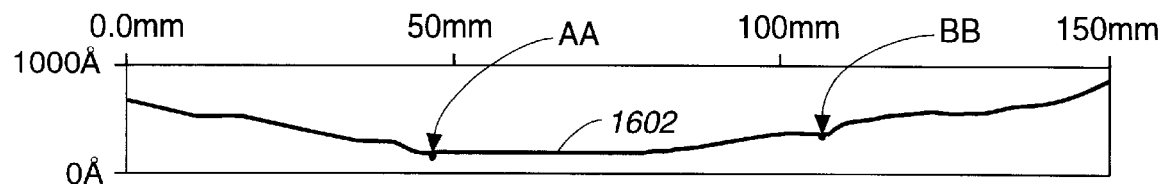
FIG._29A
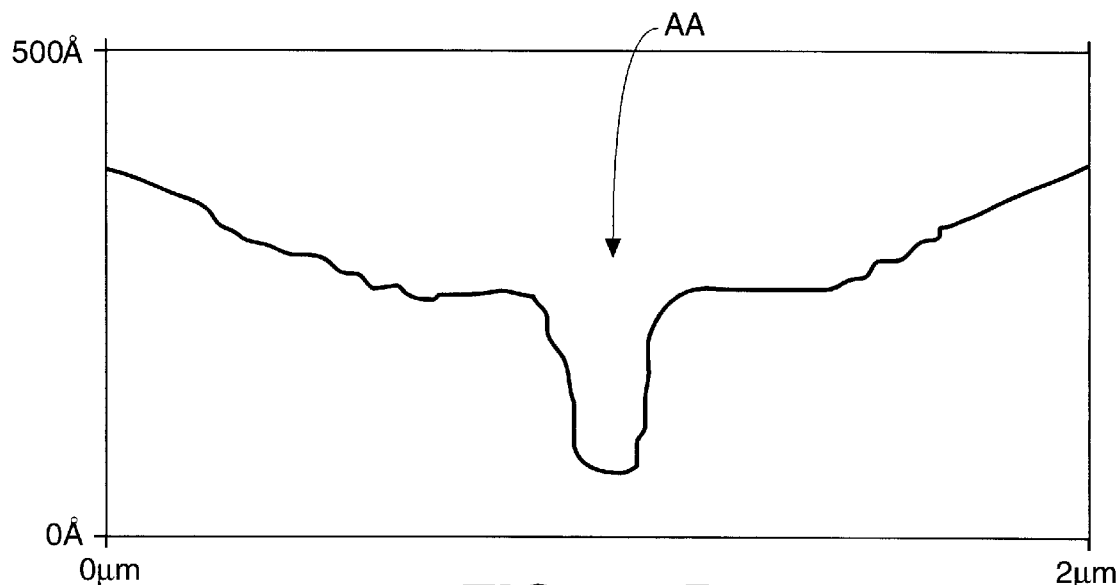
FIG._29B
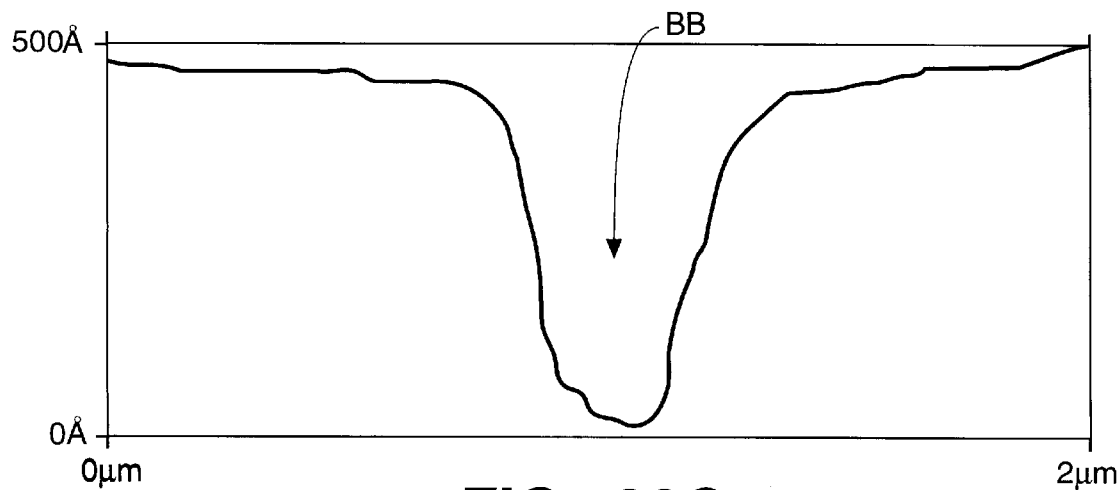
FIG._29C

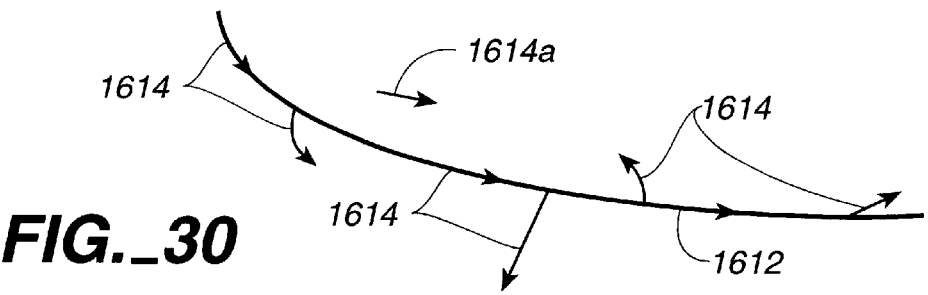
FIG._30
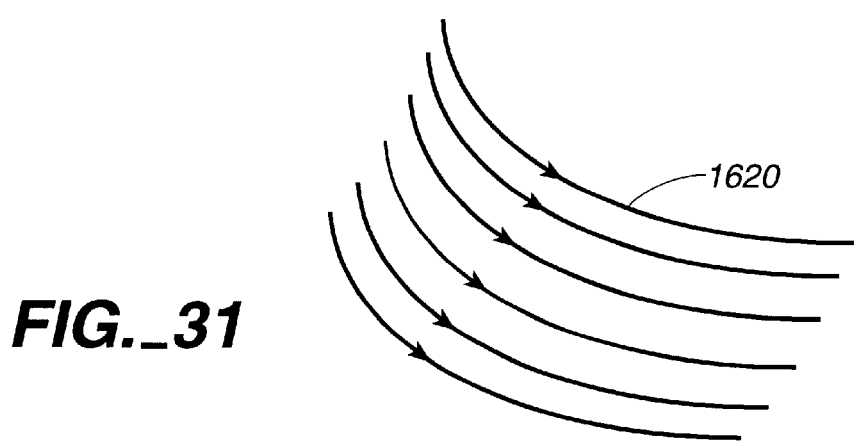
FIG._31
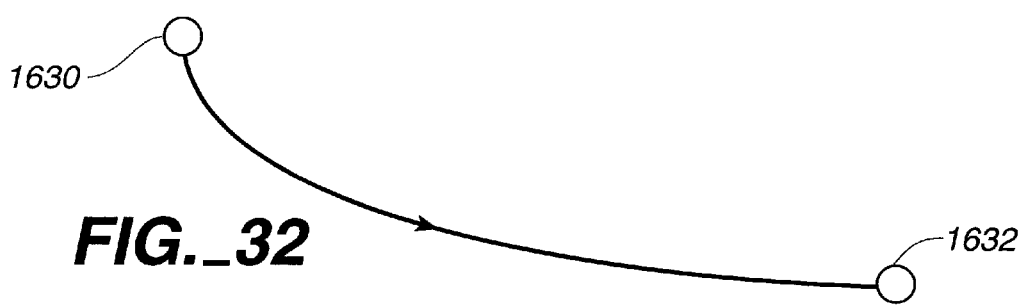
FIG._32
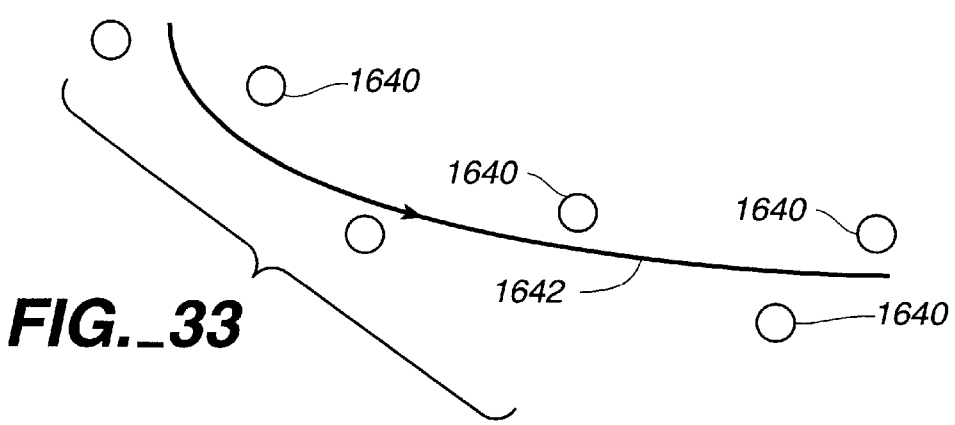
FIG._33

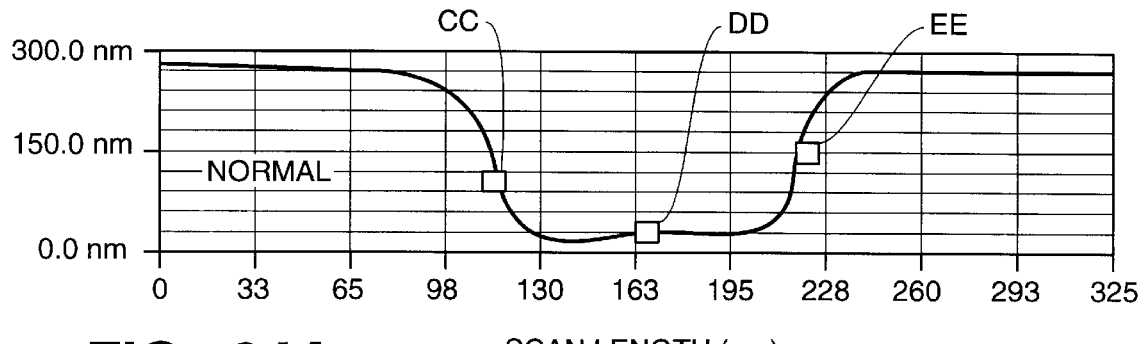
FIG._34A
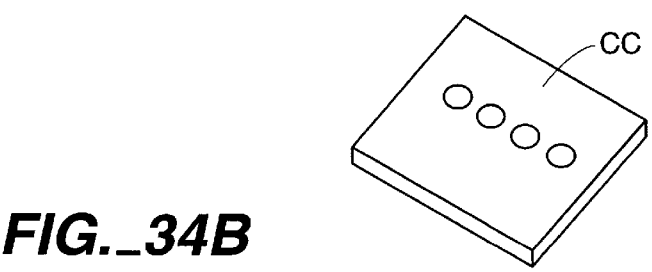
FIG._34B
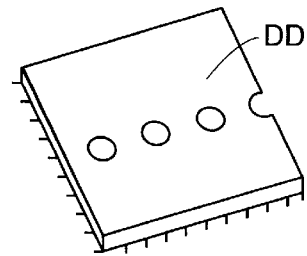
FIG._34C
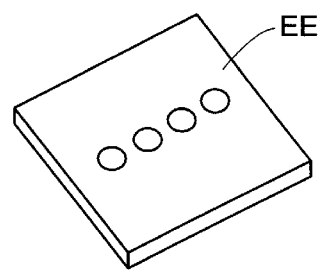
FIG._34D
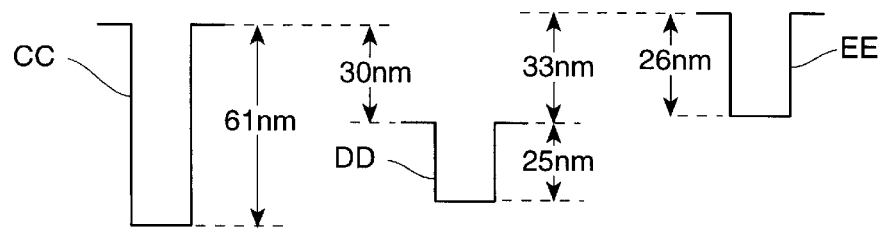
FIG._34E

DUAL STAGE INSTRUMENT FOR SCANNING A SPECIMEN

CROSS-REFERENCE TO RELATED APPLICATIONS

This application is a continuation-in-part application of Ser. No. 08/598,848, filed Feb. 9, 1996, entitled "A Dual Stage Instrument For Scanning A Specimen", now abandoned, which is in turn a continuation-in-part application of Ser. No. 08/362,818, filed Dec. 22, 1994, entitled "Constant-Force Profilometer with Stylus-Stabilizing Sensor Assembly, Dual-View Optics, and Temperature Drift Compensation", U.S. Pat. No. 5,705,741, referred to hereinafter as the "parent application." This application is filed on the same day as the application entitled "System for Locating a Feature of a Surface," referred to hereinafter as the "companion application."

BACKGROUND OF THE INVENTION

This invention relates in general to instruments for scanning samples or specimens and in particular to a system for scanning samples or specimens with improved characteristics.

Profiling instruments were first developed for the purpose of characterizing surfaces in terms of roughness, waviness and form. In recent years, they have been refined for precise metrology in the measurement and production control of semiconductor devices. Profiling instruments are also used outside the semiconductor industry, for example, for scanning and sensing optical disks, flat panel displays, and other devices.

Stylus profilometers for use in the abovementioned applications have been available from Tencor Instruments of Mountain View, Calif., and other manufacturers. In a conventional stylus profilometer, a sample is placed on an X-Y positioning stage, where the surface of the sample to be measured or sensed defines the X-Y plane. The stylus profilometer includes a stylus tip brought to a position relative to the sample to sense certain interactions between the stylus tip and the surface of the sample. The stylus and stylus tip are attached to an elevator which moves in a Z direction that is perpendicular to the X-Y plane. The sensor does not move in X or Y directions (i.e., directions in the plane parallel to the surface of the sample) The interactions between the stylus tip and the sample are measured by the sensor. In a data acquisition sequence, the X-Y stage moves the sample in a controlled manner under the stylus tip while the sensor senses variations of sample-stylus tip interactions across the sample surface as the sensor scans the sample surface. Thus during data acquisition using the sensor, the X-Y stage is moving the sample in a controlled manner.

The Alpha-Step® is another type of stylus profilometer available from Tencor Instruments of Mountain View, Calif. The Alphastep scans a sample by moving a stylus arm across the sample.

Thus stylus profilometers provide for scans in the X-Y plane for distances ranging from a few microns to hundreds of millimeters. The sensors used for profilometers usually have large dynamic range as well For example, in stylus profilometers for sample height measurements, vertical variations in the Z direction as small as a few Angstroms to as large as a few hundred micrometers can be detected. Significantly, the height measurement profilometer measures height directly.

As the semiconductor industry has progressed to smaller dimensions with each new generation of products, there is an increasing need for scanning instruments that can repeatably scan samples to a very fine resolution. The large size of the X-Y stage in the stylus profilometer limits the lateral positioning resolution of the conventional stylus profilometer. Thus the repeatability of X-Y repositioning of stylus profilometers is limited to about 1 micrometer; such device lacks the capability for repeatable nanometer or sub-nanometer X-Y positioning capability.

It is therefore desirable to provide an improved scanning instrument that can provide better X-Y repeatable positioning resolution than the conventional stylus profilometer, while retaining many of the profilometer's advantages, such as wide dynamic range in the Z direction and long scan capability up to hundreds of millimeters.

It is desirable for semiconductor wafer surfaces to be flat or planar. To achieve such global planarization, Chemical Mechanical Polishing (CMP) is employed. CMP processing is typically applied after tungsten plugs, via holes have been fabricated on the surfaces of the semiconductor wafers. If the CMP processing is not functioning properly, it may cause a recess in the tungsten plug or via hole and, therefore, affect the size and depth of the tungsten plugs and via holes. This may lead to a variation of capacitance and electrical resistance across the surface of the semiconductor wafer which adversely affect the operation of electronic circuits fabricated on the wafer. The problem becomes particularly accute in vary large scale integration circuits where the size of transistors and other electronic devices have been continually reduced. This is true also for laser textured hard disks.

To monitor the functioning of CMP processing, scanning probe microscopes and profilometers have been used. While profilometers are able to provide a measure of the surface topography of the wafer, conventional profilometers lack the resolution to discover the shape and depth of the tungsten plugs or via holes, for example. Thus, if the profilometer scan did not pass over the tungsten plug or the via hole, information from the scan would not reveal such information. Conventional profilometers lack the position/positioning capability to allow precise alignment of submicron features with the scan. Hence, if profilometers are used for monitoring the CMP process, even though the global planarization of the sample and the relative height of points that are spaced apart on the wafer can be monitored, a precise local morphology of the surface cannot be measured.

While scanning probe microscopes (SPMs) do have the precision positioning capability to allow precise alignment of submicron features with the scan path, SPM devices do not have a precise long range and repeatable motion, so that it is difficult to use SPM devices to find out the relative locations of two points that are spaced far apart on the wafer surface or the height relationship between two tungsten plugs or via holes that are spaced apart on the wafer. As a matter of fact, in many SPM devices, any tilt experienced by the devices is considered as background and is subtracted. Even if a number of local images acquired by the SPM are stitched together, the global topography of the surface is lost, and height differences between points that are spaced that are spaced apart by distances beyond the range of SPM devices cannot be precisely measured. Moreover, data correlation between a number of local images of the SPM is cumbersome, time consuming and requires significant duplication of resources.

It is, therefore, desirable to provide an improved system which avoids the above-described difficulties.

SUMMARY OF THE INVENTION

This invention is based on the observation that by including a fine stage having a resolution much finer than that of the conventional X-Y positioning stage used for the stylus profilometer, positioning resolution can be much improved while retaining all of the advantages of the conventional stylus profilometer. A positioning stage with characteristics similar to the conventional X-Y positioning stage used in the stylus profilometer will be referred to below as the coarse stage as opposed to the fine stage. A fine stage is defined as a positioning stage with resolution better than that of the coarse stage.

In the preferred embodiment and at the time of this application, a coarse stage means one that can position a sensor to an accuracy of, at best, about 100 Angstroms, and a fine stage is defined as one that can position the sensor at an accuracy better than 100 Angstroms. As known to those skilled in the art, as technology advances, the dividing line between a coarse stage and a fine stage, namely 100 Angstroms, may be continually reduced. Such coarse and fine stages with improved resolution employed in the manner described herein are also within the scope of the invention.

A first aspect of the invention is directed towards an instrument for sensing a sample, comprising a sensor for sensing a parameter of the sample, a coarse stage causing relative motion between the sensor and the sample, a fine stage causing relative motion between the sensor and the sample, and at least one controller controlling the two stages so that either one or both of the two stages cause relative motion between the sensor and the sample when the sensor is sensing a parameter of the sample.

Another aspect of the invention is directed towards a method for sensing a sample, comprising the steps of causing relative motion between a sensor and the sample by means of a coarse stage, causing relative motion between the sensor and the sample by means of a fine stage, and sensing a parameter of the sample when relative motion between the sensor and the sample is caused by each of the two stages.

Yet another aspect of the invention is directed towards an instrument having a finer lateral resolution than a conventional profilometer but retains the wide dynamic range of the conventional profilometer in the vertical direction. Such instrument comprises a sensor for sensing a parameter of the sample, where the sensor includes a stylus arm having a stylus tip for sensing a surface parameter of the sample, a hinge supporting the stylus so that the stylus arm is rotatable about the hinge and means for applying a force to the stylus arm. The instrument further includes a fine stage causing relative motion between the sensor and the sample, said fine stage having a resolution of 1 nanometer or better.

Still another aspect of the invention is directed towards a method for measuring one or more features of a surface, comprising the steps of (a) scanning a first probe tip of a profilometer or scanning probe microscope along a first scan path over the surface and sensing a first feature to provide first data on the first feature; and (b) scanning a second probe tip of a profilometer or scanning probe microscope of the first probe tip along at least a second scan path over the surface and sensing at least one second feature to provide second data on the at least one second feature, said second path being shorter than the first scan path. The resolution of the sensing during the second scanning step is higher than that during the first scanning step. One more aspect of the invention is directed towards an apparatus for measuring a sample, comprising two sensors, one suitable for use in the profilometer, and the other in a scanning probe microscope; in coarse stage for causing relative motion between the two sensors and the sample; and a fine stage for causing relative motion between the two sensors and the samples.

BRIEF DESCRIPTION OF THE DRAWINGS

FIG. 1 is a schematic view of a dual stage scanning instrument to illustrate the preferred embodiment of the invention.

FIG. 2 is a block diagram of a dual stage scanning instrument and its control and display system to illustrate the preferred embodiment of the invention.

FIG. 3A is a schematic view of a height sensor connected to a piezoelectric tube serving as the fine stage of a dual stage scanning instrument to illustrate a first embodiment of the fine stage and sensor assembly.

FIG. 3B is a perspective view of a height sensor and two piezoelectric tubes serving as the fine stage to illustrate the second embodiment of the fine stage and sensor assembly.

FIG. 4A is a side perspective view of a sensor assembly employing a magnetic means for causing a stylus tip to apply a desired force to a sample to illustrate the preferred embodiment of the invention.

FIG. 4B is a cross-sectional view of a portion of the sensor assembly of FIG. 4A.

FIG. 4C is an end perspective view showing details of the magnetic stylus force biasing means of the sensor assembly of FIG. 4A.

FIG. 4D is a block diagram of the electronics for stylus force adjustment according to the present invention.

FIG. 4E is a schematic diagram of a sensor assembly employing a capacitative means for causing a stylus tip to apply a desired force to a sample to illustrate another embodiment of the invention.

FIG. 5 is a schematic diagram of a dual stage scanning instrument where the sample is supported by the fine stage and the sensor is supported by the Z portion of the coarse stage to illustrate another embodiment of the invention.

FIG. 6 is a schematic diagram of a sensor that can be used in a dual stage scanning instrument of this application to illustrate one embodiment of the sensor.

FIGS. 7A–7C are schematic diagrams of a sensor of the type shown in FIG. 6, by showing different embodiments of the deflection sensor portion.

FIG. 7D is a schematic diagram of a probe portion to illustrate another embodiment of the proximity sensor of FIG. 7C.

FIGS. 8A–8C are schematic drawings of the sensor of the type shown in FIG. 6, by showing different embodiments of the secondary sensor in more detail.

FIG. 9 is a schematic diagram of a stylus tip that may be used to implement the sensor of FIG. 8A.

FIG. 10 is a cross-sectional view of a stylus tip which can be used to implement the sensor in FIG. 8B.

FIG. 11 is a top view of a deflection sensor made from a planar sheet of material to illustrate the preferred embodiment of the invention.

FIG. 12 is a top view of a portion of a fine stage employing piezoelectric stacks to illustrate the invention.

FIG. 13 is a schematic view of a path of scanning of a sample surface followed by a sensor in a dual stage scanning instrument to illustrate the preferred embodiment of the invention.

FIG. 14 is a block diagram of a surface measurement system useful for illustrating the invention of the companion application.

FIG. 15 is a schematic view of a target area of a surface having a feature and search paths thereon to illustrate the method for locating the feature of the invention of the companion application.

FIG. 16 is a schematic view of a target area of a surface and search paths thereon illustrating a method for searching the feature of FIG. 15 to illustrate the invention of the companion application.

FIG. 17 is a schematic view of a target area of the surface having a feature and search paths thereon illustrating a method of the invention of the companion application.

FIG. 18 is a representative cross-sectional view of a feature of the surface to illustrate the invention of the companion application.

FIGS. 19A–19I are schematic views of a target area of a surface having a feature therein and search paths thereon to illustrate a method for searching the feature as the preferred embodiment of the invention of the companion application.

FIGS. 20A–20C are schematic views of a target area of a surface having a feature therein and search paths thereon to illustrate a searching method employing an intermittent contact mode in combination with contact or non-contact mode for illustrating another embodiment of the invention of the companion application.

FIG. 20D is a schematic view of a larger and a smaller target area of a surface having a feature therein and search paths thereon in both target areas to illustrate searching method for illustrating yet another embodiment of the invention of the companion application. The method can be used in contact mode, non-contact mode or intermittent contact mode.

FIGS. 21A–21C are cross-sectional views of a surface and intermittent search paths to illustrate another embodiment of the invention of the companion application.

FIG. 22 is a schematic view of a target area of a surface and search paths thereon illustrating a searching method employing a sequence of random locations for finding the approximate location of the feature and a non-random algorhithm for locating the feature boundary once the approximate location of the feature has been located for illustrating still another alternative embodiment of the invention of the companion application.

FIG. 23 is a schematic view of a spiral search path on a surface for searching a feature on or in a surface to illustrate still another alternative embodiment of the invention of the companion application.

FIG. 24 is a schematic view of a substantially rectilinear spiral search path for locating the feature of a surface to illustrate one more alternative embodiment of the invention of the companion application.

FIG. 25 is a schematic view of a serpentine search path for locating the feature of a surface to illustrate still one more alternative embodiment of the invention of the companion application.

FIG. 26 is a schematic diagram of a conventional scanning probe microscope useful for illustrating the invention.

FIG. 27 is a schematic view of a dual stage scanning instrument including a scanning probe microscope sensor as well as a profilometer sensor where both sensors are mounted on the same fine X-Y stage to illustrate yet another embodiment of the invention.

FIG. 28 is a schematic view of a dual stage scanning instrument with the two sensors of FIG. 27 but where only the scanning probe microscope sensor is mounted onto a fine stage to illustrate one more embodiment of the invention.

FIG. 29A is a schematic view of a profile of a surface scanned over two points AA, BB to illustrate the invention.

FIGS. 29B, 29C are local high resolution profiles of the surface of FIG. 29A at high resolution to show the local profile at the points AA, BB, respectively.

FIG. 30 is a schematic view of a scanning operation where a long scan is taken over a surface as well as a number of short scans, some of which intersect the long scan and where at least one short scan is in the vicinity of but does not intersect the long scan to illustrate the invention.

FIG. 31 is a schematic view of a scan path that includes a number of substantially parallel scan line segments to illustrate the pattern of scanning for either the long scan or the short scan to illustrate the invention.

FIG. 32 is a schematic view of a scan path where the same scanning instrument is used to perform a long scan between a starting point and an end point as well as short local scans at a starting point and end point to illustrate a preferred embodiment of the invention.

FIG. 33 is a schematic view of a scan path performed in the vecinity of a number of points on the surface as well as local scans at such points to illustrate another embodiment of the invention.

FIGS. 34A–34E are schematic views of a profile and of three local features as well as their relative heights to illustrate the invention.

For simplicity in description, identical components in the different figures of this application are identified by the same numerals.

DETAILED DESCRIPTION OF THE PREFERRED EMBODIMENT

FIG. 1 is a schematic view of a dual stage scanning instrument 100 to illustrate the preferred embodiment of the invention. Since the sensor assembly 60 may be much lighter than the sample or specimen 90, it may be desirable to support the sensor by means of the fine stage 70 and use the XY portion 80*b* of the coarse stage 80 to support the specimen or sample. The fine stage is in turn connected to and supported by the Z portion 80*a* of the coarse stage. Thus as shown in FIG. 1 the scanning instrument 100 includes a sensor assembly 60 connected to and supported by a fine stage 70 which in turn is connected to and supported by the Z portion 80*a* of the coarse stage 80. A sample 90 is supported by the XY portion 80*b* of the coarse stage 80. The Z portion 80*a* and X-Y portion 80*b* of coarse stage 80 are connected to and supported by base 102 as shown in FIG. 1.

Fine stage 70 preferably has a lateral resolution of about 1 to 50 Angstroms (0.1 to 5 nanometers), although a lateral resolution of 100 or even 1000 Angstroms (10 or 100 nm) may be adequate for some applications. The lateral resolution of the coarse stage 80 is preferably about 50 to 100 Angstroms (5 to 10 nanometers) and a vertical resolution of about 10 to 50 Angstroms (1 to 5 nanometers), although a lateral and vertical resolution of 1 micrometer may be adequate for some applications.

The coarse stage has a scan range of about 1 micrometer to 100's of millimeters, such as 500 millimeters While the fine stage has a scan range of about 0.01 to 500 micrometers, this is compensated for by the coarse stage so that the dual stage instrument 100 has a scan range of about 0.01 micrometer to hundreds of millimeters, such as 500 millimeters. This will be illustrated in more detail below. Sensor 60 is of a type that has a dynamic range that can accommodate the vertical dynamic range of the coarse stage, or at least about 500 micrometers.

Instrument 100 can be used in a number of modes for sensing samples. Thus instrument 100 can be used in the same manner as a conventional profilometer. By deactivating the fine stage 70, the coarse stage 80 can be used in the same manner as a conventional profilometer for scanning sample 90 by means of sensor assembly 60. This is possible since sensor assembly 60 has an adequate dynamic range to accommodate possible large variations in the height of a surface of sample 90 over a long scan that can be as long as hundreds of millimeters Another possible mode of operation is to use the coarse stage to move the sensor assembly 60 while sensing the sample in a manner similar to that of a conventional profilometer to locate an area of interest of the specimen or sample 90, while the fine stage is deactivated After such an area has been located, the coarse stage can be deactivated and the fine stage activated and used to scan the area of interest at high resolution. In other words, the two stages may be used sequentially to move the sensor while a sample parameter is being sensed.

Yet another possible mode of operation is to operate both the fine stage 70 and the coarse stage 80 substantially simultaneously and the sensor assembly 60 is used to sense a parameter of the sample 90 while both stages are substantially simultaneously causing relative motion between the sensor assembly and sample 90 Thus the X-Y portion 80b of the coarse stage may be used to move the sample along the X axis while the fine stage 70 is used to move the sensor assembly 60 along the Y axis. While both stages are causing relative motion between the sensor assembly and the sample, the sensor assembly 60 may be used to sense one or more parameters of sample 90. In this manner, since the X-Y portion of the coarse stage 80 is stationary in the Y direction, the resolution of the fine stage 70 would control when the sensor assembly 60 senses the parameter of the sample along the Y direction. Then to obtain the same resolution along the X direction, the X-Y portion 80b of the coarse stage may be used to move the sample along the Y direction but remain stationary along the X direction, while the fine stage is used to move the sensor assembly 60 along the X direction but remain stationary along the Y direction. In this manner, fine resolution can be achieved along both the X and Y directions. Further modes of operation will be described in more detail below.

FIG. 2 is a block diagram of a dual stage scanning instrument and its control and display system to illustrate the invention. FIG. 2 need to be modified only slightly for controlling ther embodiments of the instrument, such as the one shown in FIG. 5.

As shown in FIG. 2, the fine stage 70 is controlled by a fine stage control 110. The Z portion 80a of the coarse stage is controlled by the coarse Z control 112 and the X-Y portion 80b of the coarse stage as controlled by a coarse X-Y control 114. The sensor assembly 60 and sample 90 are controlled by a sensor/sample control 116. Thus control 116 may apply a voltage to a sample with controlled frequency and amplitude, or an electrical signal may be sensed from the sample. A storage device 118 is used for storing the data from the sensor assembly 60. The storage device 118 also receives XYZ positioning information from controls 110, 112, 114, 116, so that the parameter of the sample sensed can be correlated with the XYZ position of the sensor assembly 60, and therefore to particular locations of the sample 90. System controller 120 is used to control the overall system and for providing information to a monitor 122 for display. Thus the parameter sent by assembly 60 together with the positioning information from controls 110–116 may be processed on the fly by system controller 120 and displayed; alternatively, such data may be stored in storage device 118 and processed and displayed at a later time. System controller 120 and the controls 110–116 are used to enable assembly 60 to perform various operations as described below. Implementation of the controls 110–120 based on their functions as described herein is routine and known to those skilled in the art.

FIGS. 3A, 3B, 4A–4D and 5 illustrate different embodiments of the fine and coarse stages and of the sensor assembly 60. FIG. 3A is a perspective view of one embodiment of the fine stage and of the sensor assembly. In FIG. 3A, the fine stage 70' includes a piezoelectric tube 132. The embodiment of FIG. 3B differs from that of FIG. 3A in that the fine stage 70" includes two piezoelectric tubes 132 instead of one. The same embodiment 60' of the sensor assembly is shown in FIGS. 3A, 3B, 4A–4D and 5. The construction of one embodiment 60' of sensor assembly 60 and the operation thereof described below in reference to FIGS. 4A–4D are taken essentially from the parent application.

With reference to FIG. 4A, a diamond stylus tip 11 having a radius of 0.01 mm or less is adhered to an end of a slender stainless steel wire 13 which is bent at a right angle. The wire radius is about 0.25 mm. The diamond tip is adhesively mounted to a squared-off end of the wire 13, while the opposite end of the wire 13 is inserted into an elongated hollow aluminum arm 15 which has a length of approximately 2 cm and a wall inside radius of approximately 0.018 cm. The aluminum arm is sufficiently rigid that it will not bend when sensing step heights, yet sufficiently low mass that its moment of inertia can be kept low. The overall mass of the arm, wire and diamond tip should preferably not exceed approximately 0.05 grams. Arm 15 fits into a support block 19 and is operably connected to flexural pivot 21, which also fits into support block 19. In this manner, the aluminum arm 15 has a center of rotation about the flexural pivot 21. The flexural pivot 21 has enough torsion to lightly hold the stylus tip 11 downwardly against a surface to be measured, such as specimen or sample 10. The entire mass on the stylus side of the pivot should preferably not exceed 0.50 grams, including a lever 59 described below.

An electrical solenoidal coil 51 is comprised of wire coil 53 around a plastic bobbin 50. The wire used is preferably thousands of turns of fine copper wire. The coil 51 becomes magnetized on application of current by means of wires 55, seen in FIG. 4B. The magnetized coil 51 attracts a ferromagnetic tip of an aluminum lever 59. The lever 59 has an end opposite the ferromagnetic tip which is affixed to the support block 19. The ferromagnetic tip is preferably a magnet that is made of a material that is very hard magnetically and has a very strong field for its sized, such as a neodymium-iron-boron magnet. A magnet 57 is shown in a holder 52 attached to the end of lever 59 opposite support block 19 in FIGS. 4A–4C. Lever 59 is preferably curved so that magnet 57 may be positioned directly above flexural pivot 21. By applying current to the wires 55 and magnetizing the coil 51, magnetic force is exerted on the lever 59 causing a force bias in the form of a pull toward or away from the center of coil 51. The lever 59 should be lightweight, yet stiff so that the lever will not bend on the application of magnetic force. The magnet 57 and magnetic coil 51 are part of the stylus force biasing means of the present invention.

Variations in the force exerted as the magnet 57 moves may be minimized and the magnitude of the force maximized by placing the magnet 57 near the position of the peak magnetic field gradient, i.e., on the axis of the coil 51 and proximate to the plane of the end of the coil winding. In the preferred embodiment of the invention, the magnet 57 is spaced apart from the coil winding 51 to prevent it from traveling inside the center bore of the coil. At its closest position, magnet 57 is nearly touching the coil 51. The placement of magnet 57 allows for easy adjustment of the position of the magnet. Alternatively, magnet 57 can be positioned so that it enters the center bore of the coil 51. This allows the magnet's range of travel to be centered on the peak of the magnetic field gradient, but requires precise alignment of the magnet 57 with the coil 51.

The use of a very powerful material for the magnet 57, such as a neodymium-iron-boron material, allows the magnet to be very small and light in weight and to still generate useful amounts of force. In the preferred embodiment, the magnet is 3 mm in diameter and 1.5 mm thick. The corresponding low current requirement minimizes the power dissipated in the coil, which minimizes the heat generated. This in turn minimizes the thermally-induced expansion and contraction of the materials comprising the sensor assembly. These thermally-induced size changes can cause undesirable drift in the measured profile of the sample or specimen.

In the preferred embodiment, the underside of a support body 71 has attached a transducer support 72 which acts as an elevational adjustment for a pair of spaced-apart parallel capacitor plates 35 and 37. The spacing between the plates is approximately 0.7 mm, with an air gap between the plates. A small spacer, not shown, separates plate 35 from plate 37 and a screw fastens the two plates to transducer support 72. The area extent of the plates should be large enough to shield the vane 41 from outside air, so that the vane experiences resistance to motion due to compression of air momentarily trapped between the closely spaced plates. A pair of electrical leads 39 of FIG. 4B is connected to the parallel plates, one lead to each plate. Between the parallel plates, a low mass electrically conductive vane 41 is spaced, forming a capacitor with respect to each of the parallel plates 35 and 37. The range of motion of the vane, indicated by arrows A in FIG. 4B, is plus or minus 0.16 mm. Moreover, vane 41, being connected to the support block 19 and flexural pivot 21, damps pivoting motion as the vane attempts to compress air between the parallel plates. This damping motion of the vane serves to reduce vibration and shock which may be transmitted into arm 15. Vane 41 is connected to a paddle 43 which is the rearward extension of support block 19, opposite stylus arm 15, serving to counterbalance the arm. The total mass of the vane, paddle and pivot member on the vane side of the pivot should preferably not exceed about 0.6 g. Movement of the vane between plates 35 and 37 results in change of capacitance indicative of stylus tip motion. Such a motion transducer is taught in U.S. Pat. No. 5,309,755 to Wheeler.

The illustrated configuration of the support body 71, L-shaped bracket 73, and transducer support 72 is intended only as an example of a support for the sensor stylus assembly of the present invention. Additionally, the stylus displacement measurement means or motion transducer described and positioned relative to the stylus tip is preferred, but may be substituted by an equivalent means for indicating the stylus tip motion.

In operation, the stylus tip 11 scans a surface to be measured, such as a patterned semiconductor wafer. Scanning may be achieved either by moving the stylus arm frame with respect to a fixed wafer position or alternatively moving the wafer, on an X-Y positioning wafer stage such as the fine and/or coarse stages with the position of the stylus fixed, or a combination of the two motions In the latter instance, the stylus arm may be moved linearly in the X direction while the wafer is advanced in the Y direction after each lengthwise X direction scan. The stylus tip 11 is maintained in contact with the surface of the wafer at a steady level of force by an appropriate bias applied through the coil 51 into the lever 59. The bias is preferably great enough to maintain contact, but not great enough to damage the surface being measured. Deflections of the tip 11 are caused by topological variances in the surface being measured and these are translated rearwardly through the flexural pivot 21 to the vane 41. Vane 41 resists undesirable large amplitude motion due to vibration because of the air displacement between the parallel plates 35 and 37. However, as the air is compressed and displaced, the vane 41 moves slightly causing a signal in electrical leads 39 reflecting a change in an electrical bridge circuit connected to these wires. At the end of a scan, the tip 11 is raised to protect it from damage in the event that a wafer is changed.

In building arm 15, wire 13 and tip 11, it is desirable to maintain the moment of inertia as small as possible. The mass-radius squared product should preferably not exceed about 0.5 g-cm$^2$. The current design has a mass-radius squared product of 0.42 g-cm$^2$. The radius is measured with respect to the center of the flexural pivot 21 to the furthest radial extent of the steel wire 13. A similar moment of inertia is calculated with respect to the vane 41 and the lever 59. The sum of the moments is termed the moment of inertia for the entire stylus arm By maintaining a low moment of inertia, the stylus arm is less sensitive to vibration. Greater resolution in profile measurements of thin films, and the like, may therefore be achieved in the preferred embodiment.

The present invention signifies an improvement over the prior art because it allows for a dynamic change in the force coil current as the stylus moves vertically, thereby eliminating the stylus force variability of previous devices. The instrument of the present invention may be calibrated by serving the drive current to move the non-engaged stylus to regularly spaced positions to create a table of position versus current settings. That table provides the data for a polynomial curve fit approximation. A digital signal processor 84 of FIG. 4D uses the curve fit to dynamically change the force setting as the position measurements are taken, with a specimen in place. A positive, constant force is generated by adding a steady current offset to the fit polynomial, as a direct fit would result in zero force.

FIG. 4D provides an illustrative block diagram of the above stylus force adjustment electronics. The electrical signals produced by motion transducer 81, i.e., vane 41 in conjunction with parallel plates 35 and 37, are selected and stored within a signal conditioning circuit 82 for specified vertical positions, creating data points, while the stylus tip 11 is not in engagement with specimen 10. Since the stylus tip is supported by a flexure, i.e., a torsion spring, the data points are directly proportional to force levels because of the spring law, F=kx. The signals are then converted to a digital format by converter 83 and a digital signal processor 84 generates a polynomial curve for the data points. The curve is then adjusted by processor 84 to represent the force desired upon stylus tip 11 during profiling. The adjusted curve provides modulation instructions, i.e, feedback signals, which are converted to an analog format by converter 85 and signal the circuit 86 driving the coil 51 to modulate current 87 within the coil for constant stylus force.

The above description of one embodiment 60' of the sensor assembly 60 is taken from the parent application. In reference to FIGS. 1, 3A, 3B and 5, in the event the assembly 60' is employed, fine stages 70, 70', 70" and the Z portion 80a of the coarse stage respectively are connected or attached to the support body 71 of the sensor assembly 60'. Another aspect of the invention is directed to a combination of a fine positioning stage and the sensor assembly 60' of FIGS. 4A–4D. Such a combination has the advantage of fine X-Y or lateral resolution of 1 nanometer or better while retaining the wide Z or vertical dynamic range of the conventional profilometer.

Instead of a magnetic force biasing device shown in FIGS. 4A–4D, a capacitive force biasing device 91 comprising two capacitive plates 93 may be used. As shown in FIG. 4E, arm 162 is attached through a connector 166a to a deflection plate 95 placed between the two plates 93 supported by support 150. A voltage supply (not shown) is used to apply appropriate voltages to the two plates 93 to cause the stylus tip 164 to apply a desired variable or constant force to the sample or specimen. The desired force can be controlled in a manner the same as the one described above for the magnetic biasing in rerefence to FIG. 4D.

In reference to FIGS. 3A, 3B, the piezoelectric tubes 132 each has an axis 132'. One end of the tube(s) is attached to support plate 134. When appropriate voltages are applied to each tube 132, the tube can be caused to bend in a direction perpendicular to its axis 132' relative to base plate 134, in order to cause the sensor assembly 60 to move in any direction in the X-Y plane. Appropriate voltages can also be applied to each of the tubes 132 to cause the tube to expand or contract in the direction parallel to its axis 132'. In this manner, each of the tubes 132 can be controlled to move the sensor assembly 60 along the Z axis. The manner in which this can be done is explained in detail in "Single-Tube Three-Dimensional Scanner for Scanning Tunneling Microscopy," Binnig and Smith, *Rev. Sci. Instrum.*, 57(8), August 1986, pp. 1688–1689. Therefore, a detailed explanation of how the tubes 132 can be controlled to cause motion of assembly 60 in any direction in three-dimensional space will be omitted here.

The arc motion of the tube is non-linear and may produce errors in the Z direction. This can be corrected by using capacitative devices 136 to measure the position of the sensor assembly 60 in the Z direction and feeding back any Z motion to the fine stage control 110. Devices other than capacitative devices 136 can also be used as known to those skilled in the art.

Thus as shown in FIGS. 1, 3A and 3B, the fine stage 70, 70', 70" are connected to a support-plate 134 which is in turn attached to the Z portion of 80a of the coarse stage as shown in FIG. 11 In one particular embodiment, the inside and outside surfaces of the tube 132 are segmented into quadrants. Different from Binnig and Smith, instead of applying a voltage only to the outside surfaces of the quadrant, appropriate voltages can also be applied to the inside surfaces of the quadrants This has the effect of doubling the motion range of the tube. Instead, a shorter tube may be used to achieve the same motion range. A shorter tube also increases the mechanical resonance frequency of the sensor assembly, which in turn allows faster motion of the fine stage.

The embodiment of FIG. 3B is advantageous over that of FIG. 3A in that the weight of the sensor assembly 60 is distributed over two tubes 132, allowing faster scans and better control of the position of the sensor assembly relative to the surface of a specimen or sample. In the embodiment of FIG. 3B, the sensor assembly 60 may be connected to the two tubes 132 by means of flexular hinges 138 consisting of stainless steel vanes.

In some applications, it may be desirable to use the fine stage to move the sample or specimen. This is shown in FIG. 5. As shown in FIG. 5, the sample 90 is supported by three piezoelectric tubes 132 connected to and supported by the X-Y portion 80b of the coarse stage. The sensor assembly 60 is attached directly to a base plate 134 which is attached in turn to the Z portion 80a of the coarse stage. Both portions of the coarse stage are then attached to and supported by the base 102 which serves as a fixed reference. In this embodiment, the sensor assembly is moved only by the Z portion of the coarse stage, whereas the sample 90 is moved by both the fine stage and the X-Y portion of the coarse stage.

FIG. 6 is a schematic diagram of a sensor 60" which is another embodiment of sensor 60 of FIGS. 1, 2, 3A, 3B and 5. Sensor 60" differs from sensor 60' of FIGS. 3A and 3B in that it includes not only a tip for sensing the height of a surface of a sample, but also a secondary sensor for sensing one or more additional parameters, such as thermal variations or an electrostatic, magnetic, light reflectivity or light transmission parameter of the sample or specimen. As shown in FIG. 6, sensor assembly 60" includes a support 150 supporting a height sensor 160 and a secondary sensor 170. The height sensor 160 includes a stylus arm 162 having ends 162a, 162b and connected to the end 162a of the arm a stylus tip 164. Height sensor 160 also includes a force control device 166 and a deflection sensor 168 for sensing the amount of deflection of the stylus arm caused by a variation of height of the surface of a sample. The deflection sensor may be magnetic or capacitive as described above in reference to FIGS. 4A–4E. Other deflection sensing schemes may also be used and are within the scope of the invention.

In reference to FIG. 6, the stylus arm 162 is supported rotatably by support 150 at hinge 182 so that when the arm is rotated, the end 162a of the arm has a dynamic range of at least about 500 micrometers. The force control 166 preferably comprises a magnetic or capacitive force biasing device 166b as described above and a connector 166a attaching the device 166b to arm 162.

The interactions between the stylus tip 164 and a surface of the sample would cause arm 162 to rotate about hinge 182. Rotation of arm 162 will cause the back end 162b to move away from or towards the deflection sensor 168. Such movement of end 162b is sensed by the sensor 168 as discussed above in order to measure directly the height of the surface of the sample.

One particular embodiment of sensor assembly 60" where the deflection sensor 168 as a capacitive sensor is illustrated in FIG. 7A. In other words, the capacitive sensor 168a functions in substantially the same way as sensor 60' of FIGS. 4A–4D described above. As end 162b of the arm moves closer to capacitive plate 202 and farther away from capacitive plate 204, end or vane 162b changes the capacitance between plates 202, 204, and this will be sensed as indicating a dip on a surface of the sample interacting with tip 164. Motion of end 162b in the opposite direction causes a corresponding change in capacitance and would indicate a hill or an upward slope of a surface interacting with tip 164. As explained in detail above and below in reference to FIGS. 4A–4D, 11 force control 166B can be used to control a force between stylus tip 164 and the surface of the sample.

FIG. 7B illustrates another embodiment of sensor 60" where the deflection sensor is a linear voltage differential transformer (LVDT) sensor. As shown in FIG. 7B, as end 162b of the arm moves when the arm rotates about the hinge 182, a core 212 attached to end 162b of the arm would move into or out of the space enclosed by coils 214 of the LVDT sensor. This would cause a change in current through the coils 214 as a direct indication of the height of a surface interacting with stylus tip 164.

FIG. 7C is another embodiment of sensor assembly 60" where the deflection sensor 168c comprises a light source 222, an input optical fiber 224 for delivering light from the light source towards a mirror 226 on the top surface of end 162b of the arm 162. Such light is reflected by the mirror 226 towards a detection optical fiber 228 which delivers the reflected light to a photodetector 230. As end 162b moves, this will cause the amount of light reflected by mirror 226 and captured by detection fiber 228 and detector 230 to change, thereby again indicating directly the height variations of a surface interacting with stylus 164. The fibers 224, 228 may be bound together for convenience in handling as shown in FIG. 7D in a support probe body 229. Suitable devices that can be used for sensor 168c include the fiber optic proximity sensor from Phone-Or, Ltd. Ashkelon, Israel; and the Series 88 fiber-optic displacement sensors from Philtec, Inc. of Arnold, Md.

As shown in FIG. 6, one or more secondary sensors 170 is attached to support 150, where the secondary sensor or sensors are placed in such position to sense a parameter other than height of the sample at a location the height of which is sensed by stylus tip 164 and deflection sensor 168.

FIG. 8A is a schematic diagram of sensor assembly 60" where the secondary sensor senses the thermal variations across a sample. The secondary sensor comprises a pair of thermal couple wires 252, 254 embedded in stylus tip 164. The pair of wires 252, 254 are connected to a thermal couple sensor 256. A more detailed illustration of a portion of the secondary sensor in FIG. 8A is illustrated in FIG. 9.

FIG. 8B is a schematic view of sensor 60" illustrating one particular embodiment of the secondary sensor. As shown in FIG. 8B, the secondary sensor is an electrostatic sensor comprising an electrically conductive core 262 surrounded by a conductive shield 264 where the core and the shield are separated by an insulating layer 266 (not shown) and where the core, shield and insulating layer are all embedded in the stylus tip 164 as shown in FIG. 10. The core is connected through wire 272 and a shield is connected through wire 274 to sensor 276. Therefore, any electrostatic charge variations of the sample at the location sensed by stylus tip 164 will be sensed by sensor 276. FIG. 10 illustrates in more detail the construction of stylus tip 164 with the conductive core 262, conductive shield 264, and insulating layer 266 embedded therein. The sharp end 268 of the stylus may be formed by the insulating layer or shield 264.

FIG. 8C is another embodiment of sensor assembly 60" where the secondary sensor comprises a light intensity reflection sensor which includes a light source 302 which supplies light through a half silvered mirror 304 to the sample at the location interacting with stylus tip 164. Light reflected or scattered by the sample at such location is detected by the photodetector 306 to sense the light reflectivity or scattering properties of the sample at the locations at which height variations are detected If the photodetector 306 is placed on the opposite side of the sample from the source 302, the sensor arrangement of FIG. 8C may be used to sense light transmission properties instead. Stylus tip 164 used in this case is preferably transparent.

FIG. 11 is a top view of a sensor assembly 300 illustrating a preferred embodiment of the assembly. The entire sensor assembly may be manufactured starting with a planar piece of silicon or silicon oxide. By means of conventional techniques used in the semiconductor industry, a plate of silicon or silicon oxide may be etched to form an arm 362 having a wider section 362' and a narrower section 362". At the end of the thinner section 362" is attached a tip preferably made of diamond. Integral with the arm 362 is a support piece 370 for supporting a force coil 372. The support 370 together with the arm 362 are connected to the remainder portion of the plate by means of two hinges 374. The force coil may comprise a layer of electrically conductive material deposited or implanted onto the surface of the support 370. Preferably, the layer of material is in the shape of a spiral. A magnet 382 is attached to the support 384 in close proximity to the force coil. In this manner, when the current is passed through the force coil, electromagnetic interactions between the force coil and the magnet will apply a force to support 370. Since support 370 is integral with arm 362 and both are attached to the support 384 through hinge 374, the force so applied to support 370 will also be applied to the arm. In other words, the magnet and the force coil serve the same functions as the ferromagnetic tip 57 and solenoid coil 51 of U.S. Pat. No. 5,309,755.

The sensor 400 has a thickness of about 0.1–0.2 mm, except for the hinges. Arm 362 is about 15 to 16 mm long. The hinges 374 are about 0.02 mm thick. The arm-support-hinge assembly has a resonance frequency of about 1 to 50 kHz.

FIG. 12 is a top view of a portion of a fine stage to illustrate one embodiment of the fine stage 70 employing piezoelectric stacks. As shown in FIG. 12, this embodiment 400 of the fine stage includes a support frame 402 and a moving frame 404 connected or attached to the sensor assembly 60. The moving frame 404 is connected to the support frame by means of four piezoelectric stacks 406a, 406b, 406c, 406d as well as eight flexure hinges 408. The piezoelectric stacks 406a, 406c are used to move the moving frame 404 along the positive or negative X axis relative to support frame and piezoelectric stacks 406b, 406d are used to move the moving frame along the positive or negative Y axis with respect to the support frame. Using piezoelectric stacks in this configuration is advantageous over the use of piezoelectric tubes in that the piezoelectric stacks cause relative motion between the moving frame and the support frame in the X-Y plane with minimal error in the Z direction. Thus by using piezoelectric stacks, motion out of the X-Y plane may be less than 5 arcs in some cases. Capacitance sensors (not shown) may be used to sense any cross-talk or non-linearity of the stage and fed back to fine stage control 110 of FIG. 2 to correct for the cross-talk or non-linearity. The reduction of error in the Z direction reduces the complexity for a separate sensor for sensing motion in the Z direction as well as feedback control of motion in the Z direction. A suitable device using piezoelectric stacks for X-Y positioning is the P-730, or P-731 from Physik Instrumente (PI) GmbH & Co, Waldbronn, Federal Republic of Germany.

Mode of Operation

Some of the modes of operation have already been described above. Thus the dual stage scanning instrument may be used like a conventional stylus profilometer by deactivating the fine stage altogether. Alternatively, the dual stage scanning instrument may be first used as a stylus profilometer to find an area of interest. Then the fine stage as well as the coarse stage are both activated for causing relative motion between the sensor assembly and the sample. As noted above, in order to retain the fine resolution of the fine stage in X-Y positioning, it is desirable to use the fine stage to cause relative motion in between the sensor assembly and the sample in a direction orthogonal to that caused by the coarse stage.

Where it is desirable to obtain a height profile of a surface of a sample, the above-described mode where the fine stage causes relative motion in a direction orthogonal to that caused by the coarse stage may be controlled in order to cover any desired area of the surface of the sample. This is illustrated in FIG. 13. As shown in FIG. 13, the fine stage is controlled to cause relative motion between the sensor assembly and the sample along the Y axis and a coarse stage causes such relative motion along the X axis.

While the controls 110–120 of FIG. 2 may be implemented using analog circuits, in the preferred embodiment, these controls are implemented using digital circuits. In such event, motors or position actuators are used in the fine and coarse stages to cause relative motion between the sensor assembly and the sample in discrete steps. As shown in FIG. 13, the motor for accomplishing fine stage motion is controlled at a much higher frequency compared to that for controlling coarse stage motion, so that the resulting relative motion of the sensor assembly relative to the sample is along a zigzag path as shown in FIG. 13. Also as shown in FIG. 13, the two stages are controlled so as to cause the relative motion between the sensor assembly and the sample to be along a zigzag path 450 that oscillates about a line 452 at a substantially constant amplitude, so that the zigzag path 450 covers a substantially rectangular area. Alternatively, the two stages may be controlled so that the zigzag path covers an area that is not rectangular in shape. The manner of controlling the two stages so that the zigzag path covers areas of other shapes is known to those skilled in the art and will not be explained in detail here.

As noted above, one or more parameters of the sample may be sensed while relative motion is caused between the sensor and the specimen by means of both the fine and the coarse stage. The sensor may be operated at a sensing rate which is independent of the speed of relative motion between the sensor assembly and the sample by the two stages. More specifically, where the two stages cause relative motion at one or more frequencies, the sensing rate of the sensor is independent of such frequencies and may be asynchronous with respect to such frequencies. The sensor may be used to sense the one or more parameters when the coarse stage causes relative motion in one direction and the fine stage does not cause relative motion in such direction. Alternatively, the sensor may be used to sense the one or more parameters when the fine stage causes relative motion in another direction and a coarse stage does not cause relative motion in such direction.

In one particular operational mode, one or both stages may be used to cause relative motion between the sensor assembly and the sample until the sensor assembly is in a predetermined position relative to a surface of the sample and this defines the initial imaging position. Then relative motion between the sensor assembly and the sample is caused so that the sensor assembly moves in an initial direction substantially parallel to the surface of the sample to scan the surface. In a contact mode, such as when sensing of the height variations of the surface of the sample is desired, the predetermined position of the sensor assembly relative to the sample is such that the stylus tip of the sensor assembly is in contact with the surface of the sample to be measured or sensed. In a non-contact mode, such as where the parameter of the sample other than height variation is to be sensed, the predetermined position is such that the sensor assembly is not in contact with the sample. In either the contact or the non-contact mode, the fine and coarse stage controls may be operated in a constant force mode where the output of the deflection sensor 168 is fed back to the force control 166 in FIG. 6 so that a constant force is applied between the stylus tip 164 and the surface of the sample. Alternatively, in both the contact and non-contact modes, this feedback may be turned off or set to a very small value in a constant height mode.

In yet another useful operational mode, either one or both of the fine and coarse stages may be used to cause relative motion so that the stylus tip 164 and the sample surface move toward each other. This motion can continue after the stylus tip is in contact with the surface of the sample to measure the compliance of the surface. Using the magnetic biasing scheme of FIGS. 4A–4D above, by increasing current applied to the force coil, the stylus tip is deflected towards the sample surface. A plot of the force versus the deflection of the arm indicates the amount the surface reacted relative to the force applied to it. If the surface is plastic and soft, the same force will cause a larger deflection compared to a hard surface and vice versa.

By using the secondary sensor to measure one or more parameters other than height variations of the sample surface at locations of the surface of the sample interacting with the stylus tip 164, it is possible to use the scanning instrument of this application to sense substantially simultaneously the height at one or more locations of the surface and another parameter of the specimen at the one or more locations. This can be done with or without using both the fine and coarse stages. In other words, it is possible to use either just the coarse stage, or just the fine stage, so as to place the sensor assembly at particular locations relative to the surface of the sample in order to measure both the height and one or more other parameters at such location of the surface.

The following description, related to a method for searching features of a surface, is taken from the companion application; such description refers to FIGS. 14–25.

FIG. 14 illustrates a system for locating and measuring a feature of interest of a surface of a sample to illustrate the invention of the companion application. As shown in FIG. 14, system 1020 includes a scanner head 1022, a sensor 1024 and a stylus tip or probe tip 1026 for sensing the feature of interest 1030 on the surface 1032 of a sample 1034. The position of the probe 1026 is controlled by a precision control block 1036 which is controlled by a system control 1038. System 1020 may be a profilometer of the type described in U.S. Pat. No. 5,309,755 to Wheeler. In such event, probe 1026 remains in contact with the surface 1032 and moves up and down when the topology of the surface changes as the tip is moved across the surface. Sensor 1024 then senses the changes of position of the tip of probe 1026 in order to measure the topology of the surface 1032.

System 1020 can also be a scanning probe microscope, in which case the probe 1026 may or may not be in contact with surface 1032. Rather, the probe 1026 is maintained at a predetermined distance from or in contact with surface 1032 by moving the scanner, sensor and probe up and down by means of a feedback signal. The change in the feedback signal then gives an indication of the topology of the surface 1032. One type of scanning probe microscope is illustrated in U.S. Pat. No. 4,724,318. The sensor 1024 can also be a capacitance, magnetic force, van der Waals, electrical resistance or current sensor for sensing parameters in addition to the topology or topography of the surface. In such manner, even though a feature of interest may not be detectable optically, as long as the feature exhibits other detectable characteristics such as magnetic force, electrical capacitance or resistance or van der Waals type forces, the feature can still be located and measured.

FIG. 15 is a schematic view of a target area of a surface having a feature of interest 1030 to illustrate the invention of the companion application. First, a target area 1040 on the surface is designated. When the dimensions of the feature to be located are known, it may be desirable to scan the probe 1026 along lines that are substantially parallel, where the spacing d between adjacent lines is less than the expected dimensions of the feature to be sensed as illustrated in FIG. 15. As shown in FIG. 15, probe 1026 may be scanned along seven scan lines where the separation d between adjacent scan lines such as 1042 and 1044 is less than the expected dimensions of the feature. In FIG. 15, the separation d is about 75% of the expected dimensions of the feature. The spacing is chosen to maximize throughput but without causing the scan to miss the feature. Preferably, such spacing is in the range of 50 to 85% of the expected dimensions of the feature.

For many features of interest, it may be important not only to locate the feature, but also a center of the feature. Thus, for tungsten plugs, vias or clusters of and electrical conductive material, bumps or valleys on the surface of a textured hard disk, or pull tip recessions of a read/write head, it is useful or sometimes important to detect the center of such features and perform the measurement having the probe at the center of the feature. FIG. 16 is a schematic view of window or target area 1040 of a surface having a feature 1030 thereon or therein to illustrate a searching method for locating the center of the feature. As shown in FIG. 16, the probe tip is first scanned along the scan line segment 1052(1), followed by scanning along line segment 1052(2), scan line segment 1052(3) and additional line segments if necessary, where segments 1052(2), 1052(3) and the additional line segments are substantially parallel to segment 1052(1). When the probe is scanned along such line segments, sensor 1024 is used to sense the feature 1030, be it topology, electrical resistance or capacitance, magnetic force, van der Waals forces, or other features with detectable characteristics. Thus, when the tip of probe 1026 is scanned along scan line segment 1052(3), sensor 1024 senses the feature 1030. Sensor 1024 not only senses the presence of feature 1030 but also the boundary points A, B of feature 1030 along the scan line segment 1052(3) and sends its output to system control 1038 to so indicate.

Once the sensor 1024 senses the presence of feature 1030, system control 1038 instructs position control circuit 1036 to stop the scanning motion along scan line segment 1052(3) even though some parts of the area 1040 remains unscanned. The boundary points A, B are noted and the mid-point C between points A, B is determined, and system control 1038 and position control 1036 cause the scanner 1022 to scan along scan line segment 1052(4) instead where the scan line segment 1052(4) passes through point C and is transverse to the scan line segments 1052(1)–1052(3). The sensor 1024 senses the boundaries D, E of the feature 1030 along the scan line segment 1052(4). Then the mid-point O of the portion of the line segment 1052(4) between points D, E is determined to be the center of feature 1030 and the controls 1036, 1038 cause the scanner 1022 to move the probe along scan line segment 1052(5), that is, through the center O of the feature 1030, in order to measure the feature. System control 1038 records the output of sensor 1024 and determines the locations of points A, B, C, D, E and O. The boundary points A, B, D, E may be found by sensing variations in the feature over the surface.

Where it is not important to determine the center of the feature and to measure the feature at its center, the above searching process may be terminated after the feature 1030 has been found when scanning along scan line segment 1052(3). The feature can simply be measured, such as at point C.

From the above procedure, it is evident that the searching method of the invention of the companion application is superior to the conventional search technique. Since no optical system separate and apart from system 1020 is used for locating the approximate location of feature 1030,. the searching method of the invention of the companion application is not limited by the resolution or power of a optical system employing one or more lenses. Since the instrument for measuring the feature is used also for locating the feature, the method of the invention of the companion application avoids the need to locate the measuring probe and sensor relative to the feature after the feature has been located. Furthermore, there is no need to acquire data over the entire target area 1040 before the location of the feature can be accurately determined. Instead, once the feature has been discovered, there is no need to scan the remainder of the unscanned portion of the target area and the user can proceed immediately to measure the feature. This greatly improves throughput and avoids wasting the user's resources.

The advantages of the invention of the companion application can be seen more clearly by reference to a concrete example. The feature of interest is an object of one micron diameter. Assuming that it is possible to first identify the feature to an accuracy of plus or minus two microns. This means that the object can be located initially at best to within a target area of four microns by four microns. One can then scan this target area along scan line segments of length of four microns along the x direction and moving the probe 1026 in the y direction by an offset of 0.75 microns each time until one of the scan lines crosses the object of interest. This means that a maximum of 5 scan lines are required to cross the object in FIG. 17. Once the scan line crosses the object of interest, then similar steps as those described above in FIG. 16 can be taken to determine the apparent center of the feature. This means that after a maximum of six scans, the center of the object is located and the measurement of the feature can proceed. Even if the scan time of each of the four micron scan line segment amounts to one second, the maximum time required from the six scans with overhead can be of the order of ten seconds. In contrast, in order to acquire 256 data points on each of 256 scan lines at a rate of one line per second over a four micron by four micron area, such procedure would require four and one half minutes, where the data points on all but one of the 256 scan lines are wasted.

FIG. 18 is a representative cross-sectional view of a feature of the surface to illustrate the invention of the companion application.

FIGS. 19A–19I are schematic views of a target area of a surface containing a feature and search scan segments to illustrate an embodiment of the invention of the companion application. As before, a target area 1040' of a surface is defined that is known to contain the feature of interest 1030' to be located and measured. Two directions for scanning are defined with scan line segments 1062 along the first direction and scan line segments 1072 along the second direction. The first and second directions are transverse to each other. As shown in FIGS. 19A–19I, the target area 1040' is on a surface which is not planar and the scan line segments 1062 and 1072 are curved line segments rather than straight line segments. Nevertheless, the same searching method can be employed to locate the feature 1030' of the surface. Thus, as shown in FIG. 19D, the feature 1030' is found when tip 1026 is scanned along scan line segment 1062a. Again, the boundary points A', B' sensed by sensor 1024 are recorded by system control 1038 and a mid-point C' between point A', B' along segment 1062a is determined and the probe is caused to scan along scan line segment 1072a in the second direction. System control 1038 then records the boundary points D', E' sensed by the sensor 1024 and the mid-point O' between points D', E' along segment 1072a is determined. to be the apparent center of feature 1030'. Then the probe is caused to scan along scan line segment 1062b where the feature 1032' is measured by sensor 1024.

FIG. 19G illustrates the scanning method where it is adequate to locate the feature without necessarily finding a center of the feature. In such event, the search can be ended after the feature is found. The feature can then be measured upon ending the search without having to further scan the surface. Alternatively, the feature can be measured along scan line segment 1072a in FIG. 19G. Where the feature is symmetrical, as shown in FIG. 19H, the center of the feature is, in some applications, more meaningful and it can be important to measure the feature at such center. FIG. 19I illustrates the search method for a substantially rectangular window on a flat surface.

FIGS. 20A–20C are schematic views of a target area of a surface having a feature of interest and of scan paths operated in different modes, including non-contact, intermittent contact and contact modes to illustrate the invention of the companion application. FIG. 20A is a schematic view of a target area and a scan path illustrating the intermittent contact mode. As shown in FIG. 20A, the tip of probe 1026 is scanned along scan line segments 1162a, 1162b, 1162c and 1162d, where these scan line segments are substantially parallel to one another. As shown in FIG. 20A, the tip of probe 1026 proceeds across the surface 1040' along each scan line segment in an intermittent mode. In the case of scan line segment 1162a, the probe proceeds first without contacting the surface, such as along portion 1162a' of the segment 1162a. Then the tip is dropped down towards the surface 1040' until it contacts the surface along portion 1162a", and then the tip is dragged along in substantially constant contact with surface 1040' along portion 1162a'". The tip is then again lifted from the surface along portion 1162a"" and then the above-described cycle is repeated as the tip is moved across the surface 1040' to trace out the scan line segment 1162a. The other three scan line segments 1162b, 1162c, 1162d are scanned by the tip in a similar manner. The advantage of an intermittent scan described above is that, in some applications, it speeds up the scanning process in comparison with an operation mode where the tip of the probe is in constant contact with the surface. This mode of operation also reduces possible damage to the probe tip and/or the surface due to frictional forces between the probe tip and the sample. The same is true for the non-contact mode in comparison to the intermittent contact or contact mode.

As before, the feature 1030' is sensed when the probe tip is scanned along scan line segment 1162d and the boundary points A', B' are noted and the mid-point of the portion of the line segment between points A', B' is noted and the probe tip is caused to be scanned along scan line or path segment 1162e transverse to the other scan line segments as before to locate boundary points D', E' so as to locate the center of the feature 1030' as before.

In some applications, it is advantageous to change the mode of operation after the approximate location of the feature has been found. Thus, where the feature to be sensed has two different characteristics that can be sensed differently, a first characteristic can be used when the surface is scanned to discover the approximate location of the feature, such as during scan paths 1162a–1162d. Then after the approximate location of the feature has been located, the user can switch to a different operational mode for sensing the center of the feature. Then the feature can be measured by means of either one of the two characteristics or any other characteristic that the feature may have. In many applications, however, it may be adequate to employ the same operational mode to find the approximate location of the feature as well as the center of the feature and use a different operational mode when the feature is actually measured. This is illustrated in FIGS. 20B and 20C.

As shown in FIG. 20B, the approximate location of feature 1030' is found when the surface 1040' is scanned using the probe tip along scan line segments 1162a, 1162b, 1162c and 1162d in intermittent contact mode. The boundary points A', B' are noted and the surface is scanned along scan line segment 1162e to find boundary points D', E', and the center O' in the same manner as that described above in reference to FIG. 20A. After the center O' has been located, however, system 1020 is then caused to operate in a contact mode where the tip of probe 1026 is caused to contact surface 1040' when it is scanned along scan line segment 1162f through the center O' to measure the feature.

In FIG. 20C, the boundary points A', B', D', E' and the center O' of feature 1030' are first located by scanning the tip of probe 1026 along scan line segments 1182a, 1182b, 1182c, 1182d and 1182e in a manner similar to that described above in reference to FIG. 20B, except that when the probe tip is scanned along segments 1182a–1182e, the probe tip is not in contact with surface 1040'. After the center O' of feature 1030' is located, system 1020 then is caused to operate in an intermittent contact mode along scan line segment 1182f, to measure the feature. Obviously, instead of measuring the feature through an intermittent contact mode along scan line segment 1182f as shown in FIG. 20C, it is also possible to measure the feature using non-contact or contact operational modes along such scan line segment. Similarly, in FIG. 20B, it is also possible to measure feature 1030' through an intermittent contact mode or non-contact mode. Such and other variations are within the scope of the invention of the companion application.

Different modes are appropriate for different measurements. For example, to find magnetic or electrical variations, it may be appropriate to use intermitent or non-contact modes. For precise geometric measurements, contact or intermitent contact mode may be more desirable. The feature can have a measurable magnetic characteristic as well as a rough surface. It can be located by in the non-contact mode and its roughness measured in the contact mode. But if such feature is very rough, it may be desirable to measure it in the intermittent contact mode instead to avoid damage to the tip or surface to avoid frictional effects inherent in a constant contact technique.

The scanning speed during the intermittent contact mode can also be faster than that in the contact mode. Then after the feature has been located and its center identified, the feature, such as its profile or geometry can then be measured through an operational mode different from that used in locating the feature and its center if desired or necessary. Thus, when measurement of the geometry or profile of the feature is desired, system 1020 would then be operated in either the contact mode or the intermittent contact mode.

In some applications, it may be desirable to be able to locate the boundaries and/or the center of the feature more accurately. For such applications, it may be desirable to repeat the above-described searching process, but at a finer resolution. This is illustrated in FIG. 20D. As shown in FIG. 20D, the target area 40 of the surface is first scanned by means of the probe tip along scan line segments 1192(1), 1192(2) and 1192(3), where the approximate location of feature 30" is discovered during the scan along 1192(3). Then a smaller target area 1040" is defined to enclose the feature 1030" and the searching process is repeated along scan line segments 1194(1), 1194(2) . . . , where the spacing between adjacent scan lines is smaller than that between the scan lines 1192(1), 1192(2) and 1192(3). If desired, the entire target area 40" may be scanned to locate the boundary points of the feature more accurately. If different boundary points such as A", B", A'", B'" are taken into account for determining the location for transverse scan 1196 than just the midpoint corresponding to only two boundary points such as A", B", the center of feature 1030" can be more accurately located. For example, a more accurate location can be identified by taking an average position between the midpoint corresponding to boundary points A", B" and the midpoint corresponding to boundary points such as A'", B'".

In order to measure the profile or geometry of a surface, in reference to FIG. 21A, system 1020 lifts the probe tip by a predetermined distance h from the surface, record the lateral distance δx traveled by the tip before it is lowered again to touch the surface and record the distance by which the probe tip has been lowered before it touches the surface again. Preferably, the tip is again lifted from such point of contact by the distance h, moved laterally by distance δx, lowered again to touch the surface, and the distance that the tip is lowered again recorded. This process is then repeated until the scan across the target area is completed. A record of such distance δx and the distances that the tip is repeatedly lowered before it touches the surface in the intermittent contact mode throughout the scan will give an indication of the geometry or profile of the surface.

In the embodiment of FIG. 21A, the probe tip is lifted after it is lowered to touch the surface 1200, without dragging the probe tip along the surface. In other words, the probe tip is caused to gently tap surface 1200 before it is lifted and the probe tip is not moved laterally across the surface while it is contact with the surface. In some applications, it may be desirable to drag the probe tip along the surface after the tip is lowered to touch the surface, in an embodiment illustrated in FIG. 21B. After the probe tip has been dragged along the surface 1200 for a predetermined distance, the probe tip is again lifted by a predetermined distance, such as h, moved laterally by a predetermined distance, and then again lowered to touch the surface 1200. After the tip touches the surface, the tip is again dragged along the surface for a predetermined distance and the above-described process repeated until a scan across the entire target area is completed as before. In the operational mode of FIG. 21B, in addition to recording the quantities h, δx and the distances by which the tip is repeatedly lowered before it touches the surface in the intermittent contact mode throughout the scan, system 1020 also records the change in height of the probe tip when the tip is dragged along the surface 1200. Such information, in conjunction with h, δx, and the distances by which the tip is lowered before it touches the surface, will give an indication of the geometry or profile of the surface when system 1020 is operated in the mode indicated in FIG. 21B.

Yet another operational mode of system 1020 in the intermittent contact mode is illustrated in FIG. 21C. Such mode is similar to that in FIG. 21A, where in the operational modes of both FIGS. 21A and 21C, the probe tip is not moved laterally to drag the tip across the surface after the tip is lowered to touch the surface, but is lifted to a predetermined height h. However, instead of moving the probe tip up and down and laterally along substantially straight lines as in FIG. 21A, the tip in FIG. 21C is moved along a more or less sinusoidal path across surface 1200 until it scans across the target area. Such and other variations are within the scope of the invention of the companion application.

A number of different types of features can be located and measured in the manner described above. In the semiconductor industry, it is frequently desirable to locate a tungsten plug, or a metal cluster or metal filled via hole, for measurement of a specific geometric, magnetic or electrical parameter. Thus, the tungsten plug, metal cluster or via hole filled with a metallic material may be located by sensing for changes in capacitance, magnetic fore, electrical resistance or geometric properties of the site. Thus, when system 1020 is operated in a non-contact operational mode, where the tip is held at a small distance above the surface and scanned at a high speed over the surface along a search pattern, the sensor 1028 senses changes in capacitance, tunneling current or magnetic parameter (e.g. magnetic force experienced by the probe tip and sensor 1024) of the surface. The change in capacitance, tunneling current or magnetic force may indicate location of a tungsten plug, metal cluster or via hole filled with a metal. Once this location is determined, the stylus or probe can be brought into contact or close proximity to the surface to measure the electrical, magnetic or geometric properties of the site. Alternatively, system 1020 may be operated in an intermittent contact mode and the resistance, capacitance or magnetic parameter of the surface is sensed at scanned locations by sensor 1024. When the resistance, capacitance or magnetic parameter changes, this may indicate the location of the tungsten plug or metal cluster or via hole. For example, the change in resistance may be indicated by the change in the amount of current flow between the stylus tip and the surface. If the amount of current flow increases, it may mean that the stylus is either at or at close proximity to a tungsten plug, metal cluster or via hole. When the tip is in contact or in close proximity to the plug, cluster or via hole, maximum current can be expected to pass. Also when the spacing between the tip and the plug, cluster or metal filled via hole is decreased, the capacitance between the probe tip and the surface is also decreased, because the dielectric effect of space between the surface and tip decreases with the spacing. When the tip is moving closer to the feature such as a plug or cluster made of a magnetic material or via hole filled with such material, the magnetic force between the probe tip and the feature may also increase until a maximum value when the feature and tip are in contact. This allows the user to locate the plug, cluster or via hole. After the plug, cluster or via hole has been located, the electrical, optical, magnetic or geometric characteristic of the feature can then be measured. The above-described effects may be detectable and the features can be sensed in the contact, intermittent contact or non-contact mode.

The above description applies to a process of locating and measurement of a magnetic feature by means of a magnetic parameter such as magnetic force. This can be performed by means of a magnetic force microscope which measures the magnetic force exerted between the sensor 1024 and a feature of a surface, such as a magnetic domain. Such magnetic domain may be a pole tip recession on a magnetic read/write head. Such magnetic force microscope may employ an atomic force microscope or a profilometer in AC or DC modulation modes as described in known magnetic microscope applications. Magnetic force microscopy is described by P. Grütter, H. J. Mamin and D. Rugar in *Springer Series in Surface Science*, Vol. 28, entitled "Scanning Tunneling Microscopy II", Eds. R. Wiesendanger and H. J. Güntherodt, published by Springer-Verlag Berling Heidelberg 1992, pp. 152–207.

Another characteristic of a parameter that may be used to locate a feature is tunnelling current between the feature and the probe tip. For example, a metal cluster on a semiconductor surface may have a radically different current tunnelling characteristic to the probe than the semiconductor surface.

Still other possible features that may be located and measured by means of the invention of the companion application are unfilled via holes and surface bumps or valleys on laser textured hard disks. The uniformity in size of these bumps and valleys is a key factor in the manufacture of hard disks. There may also be a variety of different sizes and shapes of these bumps on the disks. The bumps may have a donut shape or be asymmetrical about one or more axis. The pattern of such textured disks is generally known and the user is usually interested in measuring some key features of several of these bumps around the disk. This means that exact positioning of a bump or valley under the probe tip or stylus for measurement is desirable. The bumps can vary in size from 1 to 10 microns in lateral dimensions and a height of 100 to 1,000 Angstroms. The approximate locations of such bumps and valleys and the centers of such bumps and valleys may be located by means of the methods described above, in particular the methods described in reference to intermittent contact and contact modes for locating a geometric feature. Where intermittent contact mode is employed, the values of δx and height h employed in reference to FIGS. 21A–21C are chosen so that it is unlikely for the probe tip to "jump over" the bump or valley. A suitable range for h may be 10–1,000 Angstroms, and a suitable value for δx may be a fraction of the expected size of the feature or object. Thus, the bumps may have a donut shape of 5 micron diameter with a protrusion at the center of the donut. Of interest are the diameters of the bump along two orthogonal axes in the plane of the surface about the center of the bump, the height of the lip (the protrusion at the outer perimeter of the laser bump) of the bump and the height of the raised protrusion at the center of the bump relative to the non-textured area in a close vicinity of the bump.

Where it is desirable to locate a step on a surface, the user may wish to find the approximate location of the step by moving the probe tip in an intermittent contact mode. After the approximate location of the step has been found, the user may wish to rescan such approximate location in a contact mode. After the location of the step has been found, the user may lift the probe tip or stylus off the surface by a known distance until it clears the step, moves it laterally over the step and then lowers the tip across the surface until it touches the top of the step. The difference between the distance that the tip has been lifted and the distance that the tip has been lowered yields an indication of the height of the step. Alternatively, after the location of the step has been found, the probe tip may be caused to move across the surface at the step in contact mode, with the probe tip scaling or climbing the step by means of a sideways sensor. Once the step is sensed, the sensor can be used to measure the topography of the sidewall of the step or a trench, or a tungsten plug or a via hole by means of a sideways sensing technique such as that described in U.S. Pat. No. 5,347,854.

Other features of a surface that can be located and measured by means of the invention of the companion application include rough spots on a smooth surface or a smooth spot on a rough surface. The operating system 1020 in a contact mode or an intermittent contact mode such as shown in FIG. 21B can be used employing a friction sensor to sense the change in friction between the probe tip or stylus and the surface. A suitable friction sensor is described by M. Hipp, H. Bielefeldt, J. Colchero, O. Marti and J. Mlynek in "A Stand-alone Scanning Force and Friction Microscope", Ultramicroscopy, 42–44(1992), pp. 1498–1503, Elsevier Science Publishers.

In the description above, the probe tip is scanned along scan line segments that are substantially parallel to one another. This is, however, not required and other search paths are possible as illustrated in FIGS. 22, 23 and 24.

Instead of scanning the probe tip along substantially parallel scan lines, the feature 1030' in window 1040' of the surface may be located by means of a substantially random positioning scheme illustrated in FIG. 22. First a grid mesh 1198 is superimposed on the window 1040'. The size of the grids in the mesh is selected to be smaller than the expected size of the feature or object of interest to be located. For example, the grids may have dimensions that are within 50% to 85% of the expected size of the feature or object of interest. As shown in FIG. 22, a sequence of substantially random locations or positions a, b, c, d, e, f, . . . (where the sequence is not shown beyond location f in FIG. 22 for reasons apparent below) at the grid intersection points 1199 is first generated within the window 1040' of the surface, and system 1020 causes the probe tip to be positioned sequentially at each one of these positions in the sequence specified: a, b, c, d, e, f, . . . . As illustrated in FIG. 22, the probe tip senses for the first time the presence of the feature 1030' when it is placed or positioned in position f. To discover more information about the feature at this point, it is more efficient not to follow the sequence of random positions a, b, c, d, e, f, . . . beyond f but to follow a different positioning scheme. Instead, it may be preferable to then scan the probe tip consecutively along two transverse directions. For example, the probe tip may be scanned along two orthogonal directions X, Y in FIG. 22 in order to locate the center of the feature in the manner described above in reference to FIGS. 19D–19F. Once the center of the feature has been located, the probe tip is then scanned over such center in order to measure the feature.

In another embodiment, after the feature is discovered at location f by positioning the tip at a sequence of random locations, in order to find out more information about the feature such as its boundary, the probe tip may be moved along the +X, −X, +Y, −Y axis in any order in order to find the boundary of feature 1030' along the new axis. The boundary may be found by sensing changes or variations in a parameter detected by the tip or sensor.

Thus, the probe tip may be first moved along the positive Y axis to position 1 and then position 2 from position f to locate the boundary in such direction. After the boundary in such direction has been discovered when the probe tip moves from position 1 to position 2, it is discovered that position 2 is outside the boundary. The probe then may be moved to position 3 which is along the positive X direction from position 11 It is discovered that position 3 is within the feature and the tip is moved consecutively to positions 4 and 5, discovering that both positions are outside the feature, so that position 3 is at the boundary of the feature. The tip is then moved in the −Y direction from position 3 to position 6 discovering that it is still within the feature. The probe tip is then moved to position 7, 8 along the X direction discovering that these are within the feature, and moved to position 9 along the Y axis, discovering that it is outside the feature. It is then moved to position 10, finding that it is within the feature. Therefore, an approximation of the boundary of the feature can be obtained by drawing a line linking positions 1, 3, 6, 7, 8, 10. In a similar manner, the remaining portion of the boundary can be discovered and an approximation of such boundary indicated by drawing a line through positions 10, 13, 16, 18, 20, 22, 24, 27, 29, and back to position 1. In the above-described process, system 1020 will record the positions of the tip where sensing of the feature has been performed and the results of such sensing.

Another method that can be used for locating the feature 1030" on a surface is to scan the probe tip along a spiral path, such as in the manner illustrated in FIG. 23. As shown in FIG. 23, probe tip 1026 is scanned, beginning at position 1200 a path along the direction shown by arrow 1202. When the probe tip returns to the beginning position 1200, it then starts a spiral scan along path 1204. The spiral scan is such that adjacent portions of the scan path have different curvatures and, therefore, different angles of curvature. As illustrated in FIG. 23, for example, the spiral path at position 1206 has a curvature angle of $\theta$ whereas the adjacent portion of the curve at position 1208 has an angle of curvature of $\phi$, where $\phi$ is greater than $\theta$. In other words, the angle of curvature increases as the tip moves along the spiral path, so that the probe tip zooms into a smaller and smaller area in order to locate the feature. The change in angle of curvature is such that adjacent portions (such as portions at positions 1206, 1208) of the spiral path are not spaced further apart by more than the expected dimensions of the feature. As shown in FIG. 23, the probe tip senses the presence of the feature at or close to position 1208. At such position, the angle of curvature of the spiral path is increased so that the spiral path would cover a smaller area than it otherwise would if the feature has not been located. This will speed up the process of finding the boundaries of the feature. The positions of the tip where boundary of the feature has been sensed (such as by sensing variation in a characteristic of the feature) are recorded to define more accurately the location of the feature.

Thus, in general, a predetermined scan path may be first adopted to locate the approximate location of the feature. Once this has been accomplished, it may be advantageous to stop scanning along such path, and to scan the tip along a different path to find out more information about the feature. The above referenced predetermined path may be a set of substantially parallel scan line segments such as 1062*a* in FIGS. 19D–19G. Or it may be a sequence of substantially random locations in FIG. 22, or the spiral path in FIG. 23 from point 1200 to point 1208. After the feature has been located, it may be desirable to switch to a different scan path to more efficiently find out more information about the feature. Thus, in FIGS. 19E–19I, 20A, 20B, 20C, the tip is scanned along paths 1072*a*, 1162*e*, 1182*e*, where information from prior scans are used to determine such paths. In FIG. 22 it may be scanned along the X, Y axes or along the path defined by positions 1, 2, 3, 4, . . . without using information about the prior scan path other than the location where the feature is sensed. In FIG. 23, it is scanned along the path beyond point 1208 using information about the angle of curvature of the prior scan path as a reference (to determine the new angle of curvature) as well as the location where the feature is sensed.

Instead of scanning the tip along a curved spiral path as in FIG. 23, the spiral path can be roughly rectilinear, as shown in FIG. 24. As shown in FIG. 24, the probe tip is scanned along paths that spiral in towards a smaller area but along paths where adjacent portions of the paths are substantially parallel to one another. Such and other variations of the spiral path are within the scope of the invention of the companion application.

Instead of scanning the probe tip along parallel paths by starting always from the same edge, the probe tip can also be scanned along a serpentine path 1250 as shown in FIG. 25. Scanning a probe tip along a serpentine path may reduce the amount of time required to scan the same locations of the surface as compared to a scanning scheme where the probe must return to the same edge of the target area before it is scanned across the surface to locate the feature.

The invention of the companion application has been described by reference to preferred embodiments described above. Various changes and modifications may be made without departing from the scope of the invention of the companion application. Thus, the feature can also be detectable by means of its thermal characteristics, such as thermal conductivity by means of a temperature sensor. As another example, while the invention of the companion application has been illustrated by reference to features on the surface of samples, the same is applicable even if the feature is inside the surface as long as characteristics of the feature can be sensed or detected, such as by electrical, magnetic, optical, thermal or other means.

The above section is taken from the companion application.

FIG. 26 is a schematic view of a conventional scanning probe microscope useful for illstrating the invention. As shown in FIG. 26, the scanning probe microscope (SPM) includes a coarse X-Y stage 1502*a* and a coarse Z stage 1502*b*. The sample 90 is placed on stage 1502*a*. The SPM sensor 1504 is mounted onto a fine X-Y-Z stage 1506 which is, in turn, mounted onto stage 1502*b* by means of block 1508. The conventional SPM 1500 can be used to perform the scanning operation described below in reference to FIGS. 30–34E.

FIG. 27 is a schematic view of a scanning instrument that includes both an SPM sensor 1504 and a profilometer sensor assembly 60. Both sensors or sensor assemblies are mounted onto a fine X-Y stage which may be anyone of the fine stages described above such as stages 70, 70', 70" and 70'". As in the embodiments of the dual stage scanning instrument described above, the fine stage 70–70'" has a resolution much finer than that of the conventional X-Y positioning stage used for the stylus profilometer so that positioning resolution can be much improved while retaining all the advantages of the conventional stylus profilometer. It is also advantageous over the SPM since the system 1550 retains many of the profilometers advantages, such as wide dynamic range in the Z direction and long scan capability of the order of hundreds of millimeters.

Instrument 1550 may be controlled by means of the scheme illustrated above in FIG. 2 in essentially the same manner as that described above in reference to such figure. Either the SPM sensor 1504 or the profilometer sensor 60 may be used, since both sensors are mounted on the fine X-Y stage 70–70'". Thus control 110 may be used to control the fine stage in FIG. 27.

FIG. 28 is a schematic view of a scanning instrument having both a SPM sensor and profilometer sensor, but where the SPM sensor is mounted onto a SPM fine X-Y-Z stage (which is in turn mounted to block 134) but where the profilometer is not, to illustrate another embodiment of the invention. In system 1600, since the profilometer sensor is not mounted onto a fine stage, only the SPM sensor may be used for sensing nanometer or subnanometer features, while the profilometer sensor can still be used for long scan profiling as in the conventional stylus profilometer. Both systems 1550 and 1600 may be used to perform the scanning operations described below in reference to FIGS. 30–34E. Control 110 may be used to control the fine stage 1506 in FIG. 28.

FIG. 29A is a profile of a surface such as that of a semiconductor wafer. As shown in FIG. 29A, the surface 1602 is bow-shaped. Via holes are present at points AA, BB. As noted above, conventional stylus profilometers do not have the resolution to detect the local features of holes AA, BB shown in FIGS. 29B, 29C, even though it is able to detect the bow-shaped profile of the surface. SPMs, on the other hand, are able to detect the local features of the via holes AA, BB, but is unable to either measure the profile 1602 or to give the relative heights of the two via holes AA, BB. The invention of this application is capable of locating both the overall profile of the surface 1602, the local profile at points AA, BB at high resolution, as well as the relative height of the two via holes.

In order to obtain an overall global profile of a surface, a long scan is performed as shown in FIG. 30 along a first scan path 1612. Then a number of short scans along scan paths 1614 may be performed either at or in the vicinity of the long scan path 1612 but at a higher resolution than that employed for the long scan so that nanometer or subnanometer features illustrated in FIG. 29B, 29C can be measured. If the same probe tip of the profilometer or scanning probe microscope is used for scanning both the long scan path 1612 and the short scan path 1614, and the data sensed correlated with the X-Y-Z position of the tip, the relative height and locations of local features such as via holes AA, BB shown in FIG. 29A can be determined. Even if the long scan along path 1612 is taken with a probe tip which is different from that used for the short scans along scan path 1614, as long as the relative positions of the two probe tips are known, it is still possible to correlate the relative height and positions of local features such as via holes that are spaced far apart on the wafer surface. As noted in FIG. 30, the short scans may be taken along directions which are not in parallel to one another or to the long scan path 1612. The long scan path 1612 may have a range of up to 500 milimeters. As the probe tip is scanning along either the long scan path or the short scan paths, a feature of the surface either inside or on top of the surface are sensed by any one of the methods described above. Such features are sensed in a short scan at a resolution of 01 to 5 nanometers and a resolution of 5 to 10 nanometers in directions parallel to the surface at (i.e. in the X-Y plane) and 1 to 5 nanometers in directions perpendicular to the surface of the sample (i.e. in the Z direction)

Thus, the feature sensed in reference to FIG. 30 may be a profile or other geometric parameter, or electrical, magnetic, optical, thermal, frictional or van de Waals force parameter. If desired, the scanning system may be used to detect a different parameter in the short scan paths 1614 than the one detected along the long path 1612. In fact, different parameters may be sensed in the different short scans 1614.

The scanning operation illustrated above in FIG. 30 may be performed by means of any one of the dual stage scanning instrument described above. To coarse Z stage 80*a* and the coarse X-Y stage 80*b* may be used for moving the sensor assembly and probe tip along the long scan path 1612 and a fine X-Y stage may be used for moving the sensor assembly and probe tip in the short scans. In system 1500, for example, the coarse stages 1502*a*, 1502*b* are used for causing relative motion between sensor 1504 and sample 90 to scan the long scan path 1612 and the fine stage 1506 may be used for causing such motion along short scan paths 1614. In system 1550, coarse stages 80*a*, 80*b* are used for the long scan and fine stage 70–70''' is used for the short scan. Either one of the two sensors 60, 1504 may be used in the long scan and the short scans and different sensors may be used in the eight scans illustrated in FIG. 30. As long as the relative positions of the two sensors are known, such as by attaching the two sensors so that they have a fixed position relative to one another, the data obtained from all of the scans, long or short, as shown in FIG. 30 can be correlated. The scans along the long scan path 1612 and short scan paths 1614 can be in any one of a contact, non-contact or intermittent contact modes as illustrated above. The short scan path may have a length less than 100 microns long whereas the long scan path 1612 may have a length in excess of 100 microns long.

As shown in FIG. 30, the short scan path 1614*a* does not intersect the long scan path 1612. If it can be assumed that the topology of the surface has not changed drastically in the distance between scan path 1614 and 1612, then the data obtained in the scan path 1614*a* can still be correlated with that obtained along the portion of the scan path 1612 close to path 1614*a*. Where the short scan path and the long scan path intersect, the user may actually be able to correlate the data more accurately.

Each of the long scan paths 1612 as well as the short scan paths 1614 may actually comprise a number of scan line segments, such as 1620 shown in FIG. 31. Where the scan path segment 1620 cover a substantial portion of the wafer surface, such scan path would enable the user to measure the topography over a substantial portion of the wafer surface. Where the scan line segments 1620 are short, data acquired along such segments will reveal the topography in an area where a local feature such as a via hole is expected. In one embodiment, the segment 1620 are substantially parallel to one another. As shown in FIG. 32, it is possible to scan from a starting point 1630 to end point 1632 along a long scan and do short scans through points 1630, 1632 Preferably, the short scan through point 1630 precedes the long scan and the short scan through point 1632 is done after the long scan.

In FIG. 30, the long scan is first performed followed by the short scans. Where the locations of local features of interest are known, it may be desirable to first perform a number of short scans, each through a corresponding feature of interest followed by a long scan taken over an area of the surface not over a particular feature of interest but at a location optimized for correlating the data obtained through the short scans at each of the features of interest as illustrated in FIG. 33. Thus, short scans may first be performed through each one of the points 1640. Thereafter, an optimized path 1642 may be selected to best correlate the data obtained during the short scans through points 1640. In the preferred embodiment, a least square fit calculation may be performed based on the locations of the point 1640 to select the optimal scan path 1642

During any time in the scanning process, when the data from the scanning is analyzed in real time, the user may discover that it is desirable to look for a particular feature at or in the vicinity of the surface. In such event, the searching process described above for a feature of a surface may be employed by determining a target area and searching the surface by means of the probe tip within the target area to provide an indication of a feature of interest by detecting the feature. As a result of such searching operation, a scan path may be selected as a function of the indication. For example, if it appears that a recess is discovered in the searching operation, a scan path may be selected that will pass over such recess. As noted above, the searching process may involve scanning the probe tip along substantially parallel search line segments separated by a offset that is preferably less than the expected dimensions of the feature that is being searched. As descibed above, after the approximate position of the feature has been found, it is preferable to scan the tip along another search line segment transverse to the search line segments in the prior scans to locate the center of the feature of interest.

The scan paths, such as paths 1612, 1614, 1620, may comprise scan line segments substantially parallel to one another, as spiral scan segment or serpentine scan line segment such as illustrated in FIGS. 23 and 25.

FIGS. 34A–34E illustrate how data obtained from different scans can be correlated. FIG. 34A is a profile of a surface with three local features CC, DD, EE. Local profiles of the three features are shown in FIGS. 34B–34D respectively. As shown in FIG. 34A, the surface has a large area recess with feature CC, EE on the two sides of the recess and feature DD at the bottom of the recess. By means of the process described above, the overall profile of the recess can be measured as well as the local features CC, DD, EE at high resolution. The correlation of the local features CC, DD, EE is shown in FIG. 34E, which shows the depth of the via holes as well as the relative height of the three features.

While the invention has been described above by reference to various embodiments, it will be understood that different changes and modifications may be made without departing from the scope of the invention which is to limited only by the appended claims and their equivalents.

What is claimed is:

1. An instrument for sensing a sample, comprising:
   a probe having a sensing tip that does not emit or transmit light for sensing a parameter of the sample;
   a coarse stage causing relative motion between the sensing tip and the sample;
   a fine stage causing relative motion between the sensing tip and the sample; and
   at least one controller controlling the two stages so that the relative motion caused by the coarse stage causes the sensing tip to scan across the surface of the sample when the sensing tip is sensing said parameter of the sample.

2. The instrument of claim 1, said fine stage having a resolution of one nanometer or better.

3. The instrument of claim 1, said coarse stage having a resolution of one micrometer or better.

4. The instrument of claim 1, wherein the two stages are such that the instrument has a range of at least 500 micrometers in at least one direction when the sensing tip is used to sense said parameter of the sample.

5. The instrument of claim 1, wherein said sensing tip senses a height parameter that measures directly the height variation of a surface of the sample.

6. The instrument of claim 5, said probe including:
   a stylus arm having a stylus tip; and
   a capacitance gauge, a linear voltage differential transformer sensor, or a light intensity proximity sensor.

7. The instrument of claim 1, wherein said sensing tip senses thermal variations, electrostatic variations, magnetic variations of the sample, or the height variation of a surface of the sample.

8. The instrument of claim 1, wherein said sensing tip senses substantially simultaneously the height at one or more locations of a surface of the sample and at least another parameter of the sample at said one or more locations.

9. The instrument of claim 8, said sensing tip including a stylus tip that senses the height at one or more locations of a surface of the sample and a sensor element in the stylus tip or in the proximity of the stylus tip for sensing said at least another parameter.

10. The instrument of claim 1, wherein each of the two stages causes relative motion between the sensing tip and the sample in XYZ three dimensional space, the coarse stage comprising an XY portion for causing relative motion between the sensing tip and the sample in a direction substantially parallel to a surface of the sample and a Z portion for causing relative motion between the sensing tip and the sample in a direction substantially normal to the surface of the sample.

11. The instrument of claim 10, wherein the probe is connected to the fine stage, and the fine stage is connected to the Z portion of the coarse stage, and wherein the XY portion of the coarse stage is adapted for moving the sample.

12. The instrument of claim 11, wherein the fine stage comprises at least one piezoelectric tube, and wherein the probe is connected to the at least one piezoelectric tube.

13. The instrument of claim 11, wherein the fine stage comprises two piezoelectric tubes, said instrument further comprising a flexure hinge connecting the tubes to the sensor.

14. The instrument of claim 10, wherein the probe is connected to the Z portion of the coarse stage, and the fine stage is connected to the XY portion of the coarse stage, said fine stage being adapted for supporting and moving the sample.

15. The instrument of claim 14, wherein the fine stage comprises three piezoelectric tubes.

16. The instrument of claim 14, wherein the Z and XY portions of the coarse stage support and move the sensor and/or the sample relative to a fixed reference base.

17. The instrument of claim 10, wherein the fine stage comprises three piezoelectric tubes.

18. The instrument of claim 10, wherein the fine stage comprises piezoelectric stacks.

19. The instrument of claim 18, said fine stage further comprising a support frame, a moving frame and flexure hinges connecting the two frames, said piezoelectric stacks causing relative motion between the two frames.

20. The instrument of claim 1, wherein said probe comprises a stylus arm having a stylus tip for sensing a surface parameter of the sample, and a thermocouple embedded in the stylus tip for sensing thermal variations.

21. The instrument of claim 1, wherein said probe comprises:
   an electrically conductive core;
   a conductive shield surrounding the core for sensing electrostatic charge variations; and
   an insulating layer separating the shield from the core.

22. The instrument of claim 21, wherein the sensing tip senses a surface parameter of the sample, said tip being part of the insulating layer or shield.

23. The instrument of claim 1, wherein said probe comprises a stylus arm having a stylus sensing tip for sensing a surface parameter of the sample.

24. The instrument of claim 23, said probe further comprising a flexure hinge connected to the arm, a force coil and means for passing current into the coil and a magnet, the force coil, or the magnet being connected to the arm, wherein electromagnetic interactions between the current in the coil and the magnet move the arm towards or away from the sample.

25. The instrument of claim 24, further comprising a first member supporting the flexure hinge, and a second member connected to the arm for supporting the force coil, wherein the two members, the flexure hinge, and the arm are formed from a single sheet of material to form a planar body.

26. The instrument of claim 25, said force coil comprising a layer of electrically conductive material on the planar body, said magnet being attached to the first member.

27. The instrument of claim 25, said tip being integral with or attached to said planar body at an end of the arm, said tip being substantially perpendicular to a plane of the planar body.

28. The instrument of claim 24, further comprising a capacitance gauge, a linear voltage differential transformer sensor, or a light intensity proximity sensor for measuring motion of the arm.

29. The instrument of claim 1, wherein said at least one controller controls the two stages so that both of the two stages substantially simultaneously cause relative motion between the sensor and the sample when the sensor is sensing said parameter of the sample.

30. The instrument of claim 1, wherein said probe comprise:

a stylus arm having a stylus tip for sensing a surface parameter of the sample;

a hinge supporting the stylus tip so that the stylus arm is rotatable about the hinge; and means for applying a force to the stylus arm.

31. The instrument of claim 30, said force applying means comprising a force coil and means for passing current into the coil and a magnet, the force coil or the magnet being connected to the arm, wherein electromagnetic interactions between the current in the coil and the magnet cause the stylus arm to rotate about the hinge towards or away from the sample.

32. The instrument of claim 30, said force applying means comprising a capacitance means and means for applying a voltage to the capacitance means.

33. The instrument of claim 30, said stylus arm having a dynamic range of at least about 500 micrometers when rotated about the hinge.

34. The instrument of claim 30, said probe further comprising:

stylus displacement measuring means providing a position signal to indicate the position of the stylus tip; and feedback means controlling the force applied by the force applying means in response to the position signal to cause the stylus tip to apply a desired force on the sample, said feedback operating independently of the two stages.

35. The instrument of claim 34, said feedback means causing the stylus tip to apply a constant force on the sample.

36. The instrument of claim 1, wherein said at least one controller controls the two stages so that the fine stage causes the sensing tip to scan in a direction substantially parallel to a surface of the sample when the sensing tip is sensing said parameter of the sample.

37. The instrument of claim 1, wherein said at least one controller controls the two stages so that the coarse stage causes the sensing tip to scan in a direction substantially parallel to a surface of the sample when the sensing tip is sensing said parameter of the sample.

38. The instrument of claim 1, said probe including a control circuit, said control circuit being distinct from and not part of the at least one controller.

39. The instrument of claim 38, said control circuit generating a feedback signal for controlling the sensing tip, wherein said feedback signal is not used for controlling the fine and coarse stages.

40. The instrument of claim 1, wherein said probe does not include any piezoelectric element.

41. A method for sensing a sample employing a sensing tip that does not transmit or emit light for sensing the sample, comprising the steps of:

causing relative motion between the sensing tip and the sample by means of a coarse stage to scan the sensing tip across a first surface of the sample;

causing relative motion between the sensing tip and the sample by means of a fine stage to scan the sensing tip across a second surface of the sample;

sensing a parameter of the sample when the sensing tip is moved by each of the two stages.

42. The method of claim 41, wherein said sensing step senses the parameter at a sensing rate that is independent of the speed of motion of the sensing tip by the two stages.

43. The method of claim 42, wherein the two stages cause relative motion between the sensing tip and the sample in steps at one or more frequencies, and wherein the sensing rate is independent of the one or more frequencies.

44. The method of claim 43, wherein the sensing rate is asynchronous with respect to the one or more frequencies.

45. The method of claim 41, wherein the two stages cause relative motion between the sensing tip and the sample sequentially.

46. The method of claim 41, wherein the two stages cause relative motion between the sensing tip and the sample substantially simultaneously.

47. The method of claim 46, wherein said sensing step senses the parameter when the coarse stage causes relative motion between the sensing tip and the sample in a direction and the fine stage does not cause relative motion between the sensing tip and the sample in said direction.

48. The method of claim 46, wherein said sensing step senses the parameter when the fine stage causes relative motion between the sensing tip and the sample in a first direction and the coarse stage does not cause relative motion between the sensing tip and the sample in said direction.

49. The method of claim 48, wherein the coarse stage causes relative motion between the sensing tip and the sample along a second direction substantially orthogonal to the first direction, so that resolution of the fine stage is retained in the first direction.

50. The method of claim 46, wherein the moving steps cause relative motion between the sensing tip and the sample in two orthogonal directions in steps at different rates.

51. The method of claim 46, said moving step by means of the fine stage causes relative motion between the sensing tip and the sample along a zigzag path so that the sensing tip oscillates relative to the sample about a line and at a frequency higher than that of the moving step by means of the coarse stage.

52. The method of claim 51, said moving step by means of the fine stage causes the sensing tip to oscillate about the line at a substantially constant amplitude, so that the zigzag path covers a substantially rectangular area.

53. The method of claim 46, wherein the sensing step senses the parameter when the coarse stage causes relative motion between the sensing tip and the sample in a first direction, and when the fine stage causes relative motion between the sensing tip and the sample in a second direction orthogonal to the first direction, so that resolution of the fine stage is retained in a direction orthogonal to the first direction.

54. The method of claim 41, wherein one of or both the moving steps cause relative motion between the sensing tip and the sample until the sensing tip is in a predetermined position relative to a surface of the sample, wherein said predetermined position is an initial imaging position, and then the moving steps cause relative motion between the sensing tip and the sample when the sensing tip is sensing said parameter in an initial direction substantially parallel to the surface of the sample to scan the surface.

55. The method of claim 54, wherein one of or both the moving steps cause relative motion between the sensing tip and the sample until the sensing tip is in contact with the surface of the sample, so that the predetermined position is one in contact with the surface of the sample.

56. The method of claim 54, wherein one of or both the moving steps cause the sensing tip to move in a plane containing the initial imaging position of the sensing tip and substantially parallel to the surface of the sample in a constant height mode.

57. The method of claim 54, wherein the sensing step senses a parameter of the sample, said parameter being a thermal variation, an electrostatic or magnetic parameter, or height variation of a surface of the sample.

58. The method of claim 54, said sensor including a stylus tip for contacting a surface of the sample, wherein said sensing step provides an output signal, said method further comprising applying a force on the stylus in response to said output signal so that the stylus tip exerts a substantially constant force on the surface of the sample in a constant force mode when the surface is scanned.

59. The method of claim 54, said sensor including a stylus tip, wherein one of or both the moving steps cause the stylus tip and the sample to move towards each other after the stylus tip and the sample are in contact, said sensing step measuring changes in position of the stylus tip to measure the compliance of the surface.

60. The method of claim 41, wherein the sensing step senses substantially simultaneously the height at one or more locations of a surface of the sample and another parameter of the sample at said one or more locations.

61. The method of claim 41, said sensing step being performed independently from the causing of relative motion by the coarse and fine stages.

62. The method of claim 41, said sensing step including providing a feedback signal to control the tip, wherein said feedback signal is not used for causing relative motion by the coarse and fine stages between the sensing tip and the sample.

63. An instrument for sensing a sample, comprising:
   a probe having a sensing tip for sensing a first parameter of the sample;
   a coarse stage causing relative motion between the sensing tip and the sample;
   a fine stage causing relative motion between the sensing tip and the sample;
   a sensor spaced apart from the tip for sensing a second optical parameter of the sample; and
   at least one controller controlling the two stages and the sensor so that each of the coarse and fine stages causes the sensing tip to scan across the sample when the sensing tip is sensing said first parameter at a location of the sample and the sensor is sensing said second optical parameter of the sample substantially at said location.

64. The instrument of claim 63, wherein said second optical parameter is light reflectivity or light transmittance.

65. An instrument for sensing a sample, comprising:
   a probe having a stylus arm with a sensing tip for sensing a parameter of the sample and a member supporting the stylus arm so that the stylus arm is rotatable about the member;
   a coarse stage causing relative motion between the sensing tip and the sample;
   a fine stage causing relative motion between the sensing tip and the sample; and
   at least one controller controlling the two stages so that the coarse stage causes the sensing tip to scan across the surface of the sample when the sensing tip is sensing said parameter of the sample.

66. A method for sensing a sample employing a stylus arm with a sensing tip for sensing the samples comprising the steps of:
   causing relative motion between the sensing tip and the sample by means of a coarse stage to scan the sensing tip across a first surface of the sample;
   causing relative motion between the sensing tip and the sample by means of a fine stage to scan the sensing tip across a second surface of the sample, wherein the sensing tip is caused to rotate about a hinge during the relative motions;
   sensing a parameter of the sample when the sensing tip is moved by each of the two stages.

67. An instrument for sensing a sample, comprising:
   a probe having a sensing tip that does not emit or transmit light for sensing a parameter of the sample, said sensing tip having a dynamic range in a direction normal to a surface of the sample greater than that of a scanning probe microscope;
   a coarse stage causing relative motion between the sensing tip and the sample;
   a fine stage causing relative motion between the sensing tip and the sample; and
   at least one controller controlling the two stages so that the coarse stage causes the sensing tip to scan across the surface of the sample when the sensing tip is sensing said parameter of the sample.

68. A method for sensing a sample employing a sensing tip for sensing the sample, comprising the steps of:
   causing relative motion between the sensing tip and the sample by means of a coarse stage to scan the sensing tip across a surface of the sample;
   causing relative motion between the sensing tip and the sample by means of a fine stage to scan the sensing tip across the surface of the sample;
   sensing a parameter of the sample when the sensing tip is moved by each of the two stages, said sensing step having a dynamic range in a direction normal to the surface of the sample greater than that of a scanning probe microscope.

69. An instrument for sensing a sample, comprising:
   a probe having a stylus arm which has a sensing tip for sensing a parameter of the sample;
   a coarse stage causing relative motion between the sensing tip and the sample,
   a fine stage causing relative motion between the sensing tip and the sample; and
   at least one controller controlling the two stages so that the relative motion caused by either one or both of the two stages causes relative motion between the sensing tip and the sample when the sensing tip is sensing said parameter of the sample;
   said probe further comprising a flexure hinge connected to the arm, a force coil and means for passing current into the coil and a magnet, the force coil, or the magnet being connected to the arm, wherein electromagnetic interactions between the current in the coil and the magnet move the arm towards or away from the sample;

said instrument further comprising a first member supporting the flexure hinge, and a second member connected to the arm for supporting the force coil, wherein the two members, the flexure hinge, and the arm are formed from a single sheet of material to form a planar body.

70. The instrument of claim 69, said force coil comprising a layer of electrically conductive material on the planar body, said magnet being attached to the first member.

71. The instrument of claim 69, said tip being integral with or attached to said planar body at an end of the arm, said tip being substantially perpendicular to a plane of the planar body.

72. A method for sensing a sample employing a sensing tip for sensing the sample, comprising the steps of:

causing relative motion between the sensing tip and the sample by means of a coarse stage to scan the sensing tip across a first surface of the sample;

causing relative motion between the sensing tip and the sample by means of a fine stage to scan the sensing tip across a second surface of the sample;

sensing a parameter of the sample when the sensing tip is moved by each of the two stages, wherein said sensing step senses the parameter at a sensing rate that is independent of the speed of motion of the sensing tip by the two stages.

73. The method of claim 72, wherein the two stages cause relative motion between the sensing tip and the sample in steps at one or more frequencies, and wherein the sensing rate is independent of the one or more frequencies.

74. The method of claim 73, wherein the sensing rate is asynchronous with respect to the one or more frequencies.

75. An instrument for sensing a sample employing a sensing tip for sensing the sample, comprising:

a coarse stage causing relative motion between the sensing tip and the sample to scan the sensing tip across a first surface of the sample;

a fine stage causing relative motion between the sensing tip and the sample to scan the sensing tip across a second surface of the sample;

at least one controller controlling the two stages so that when the sensing tip is moved by each of the two stages, said sensing tip senses the parameter at a sensing rate that is independent of the speed of motion of the sensing tip by the two stages.

* * * * *